United States Patent
Kendig et al.

(10) Patent No.: US 7,686,980 B2
(45) Date of Patent: Mar. 30, 2010

(54) CORROSION INHIBITORS, METHODS OF PRODUCTION AND USES THEREOF

(75) Inventors: Martin Kendig, Thousand Oaks, CA (US); Melitta Hon, San Francisco, CA (US); Les Warren, Camarillo, CA (US)

(73) Assignee: Teledyne Scientific & Imaging, LLC, Thousand Oaks, CA (US)

( * ) Notice: Subject to any disclaimer, the term of this patent is extended or adjusted under 35 U.S.C. 154(b) by 1087 days.

(21) Appl. No.: 11/241,048

(22) Filed: Sep. 30, 2005

(65) Prior Publication Data

US 2007/0102671 A1    May 10, 2007

(51) Int. Cl.
C09K 15/12 (2006.01)
C23F 11/12 (2006.01)
C23F 11/14 (2006.01)
C23F 11/16 (2006.01)

(52) U.S. Cl. .............. 252/392; 252/391; 252/395; 252/402; 252/403; 252/406; 106/14.05; 106/14.13; 106/14.15; 106/14.16

(58) Field of Classification Search ............... 252/392, 252/403; 106/14.13
See application file for complete search history.

(56) References Cited

U.S. PATENT DOCUMENTS

| | | | | |
|---|---|---|---|---|
| 2,032,942 A | * | 3/1936 | Linscott et al. | 264/504 |
| 2,492,314 A | * | 12/1949 | Olin et al. | 556/38 |
| 3,030,263 A | * | 4/1962 | Schicke et al. | 424/695 |
| 3,434,994 A | * | 3/1969 | Smit | 524/572 |
| 4,125,481 A | * | 11/1978 | Uraneck et al. | 502/168 |
| 5,407,597 A | * | 4/1995 | Busch et al. | 252/389.23 |
| 5,516,439 A | * | 5/1996 | Takeuchi et al. | 508/374 |
| 5,589,444 A | * | 12/1996 | Hatakeyama | 508/168 |
| 6,037,314 A | * | 3/2000 | Kondo et al. | 508/363 |
| 6,464,899 B1 | * | 10/2002 | Haas et al. | 252/389.1 |
| 7,014,694 B1 | * | 3/2006 | Miksic et al. | 106/14.22 |
| 2003/0101898 A1 | * | 6/2003 | Standke et al. | 106/14.41 |
| 2005/0211957 A1 | * | 9/2005 | Ward et al. | 252/387 |

OTHER PUBLICATIONS

Buchheit, R.G., The Electrochemical Characteristics of Bulk-Synthesized Al2CuMg, 1999, 4424-4428.
Clark, William J., Inhibition of Corrosion-Related Reduction Processes via Chromium Monolayer Formation, 2002, B379-B386.
Clark, William J., A Galvanic corrosion Approach to Investigating Chromate Effects on Aluminum Alloy 2024-T3, 2002, B179-B185.

* cited by examiner

Primary Examiner—Joseph D Anthony

(57) ABSTRACT

Compositions for actively inhibiting corrosion are described herein that include at least one active corrosion inhibitor compound, and at least one conventional corrosion inhibitor compound. In addition, methods for producing a composition that actively reduces corrosion are described herein and include providing at least one active corrosion inhibitor, providing at least one conventional corrosion inhibitor compound or corrosion protection compound, and blending the at least one active corrosion inhibitor and the at least one conventional corrosion inhibitor compound or corrosion protection compound to form the composition. In addition, a composition for actively inhibiting corrosion is described herein that includes at least one active corrosion inhibitor compound, wherein the at least one active corrosion inhibitor compound comprises a derivative or salt of a thio-, thia- or dithiocarbarnic acid, or a combination thereof and at least one conventional corrosion inhibitor compound. Coatings and composite materials containing these active corrosion inhibitor compounds and compositions are also described.

9 Claims, 17 Drawing Sheets

DMT

PYRR

DMDTC

Generic Dithiocarbamate Structure

M = ammonium or alkali cation

Figure 1:
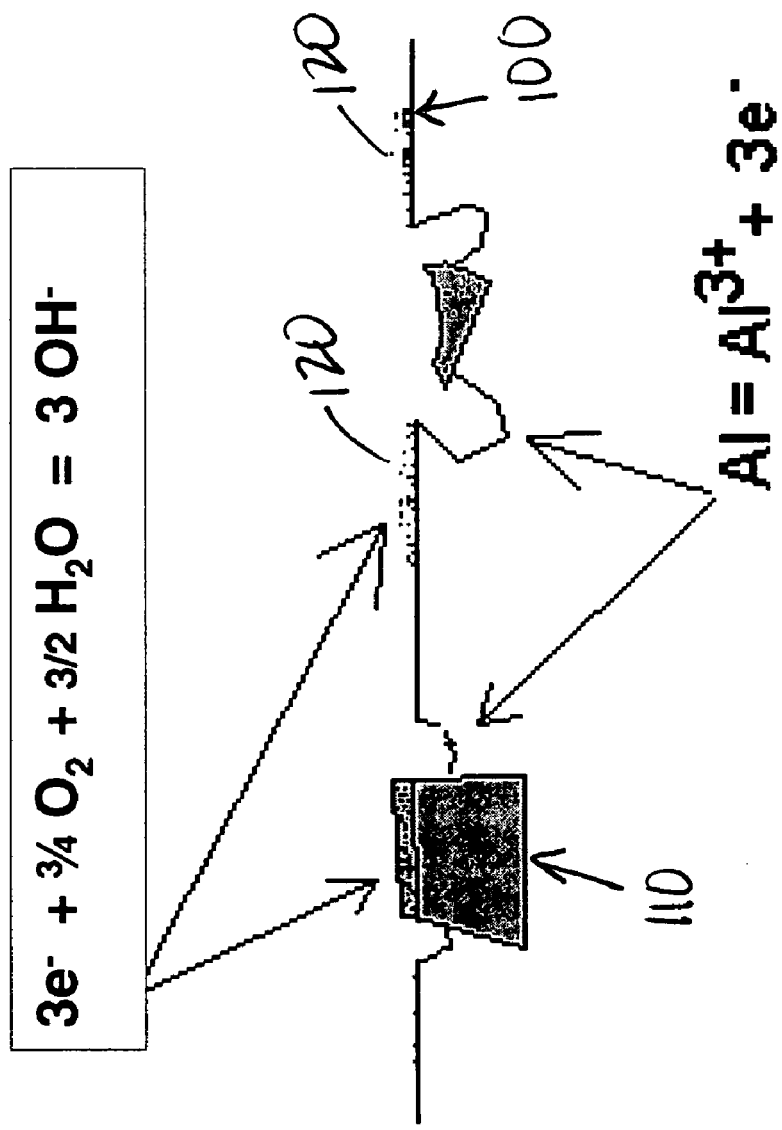

Prior Art Figure 1

Figure 2
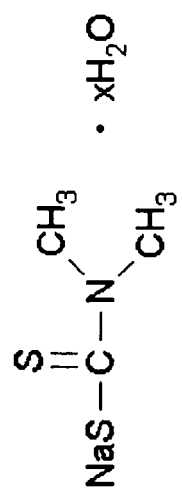
DMT
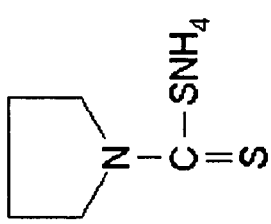
PYRR
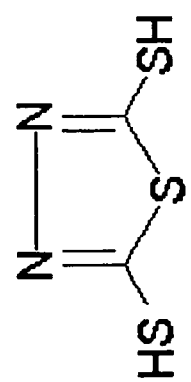
DMDTC
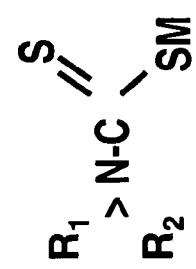
Generic Dithiocarbamate Structure
M = ammonium or alkali cation

Figure 6
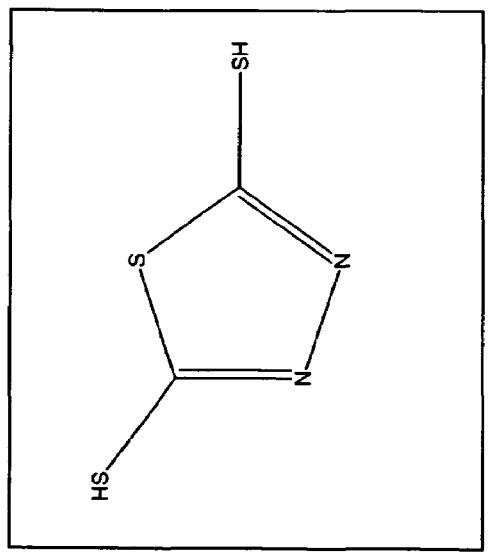
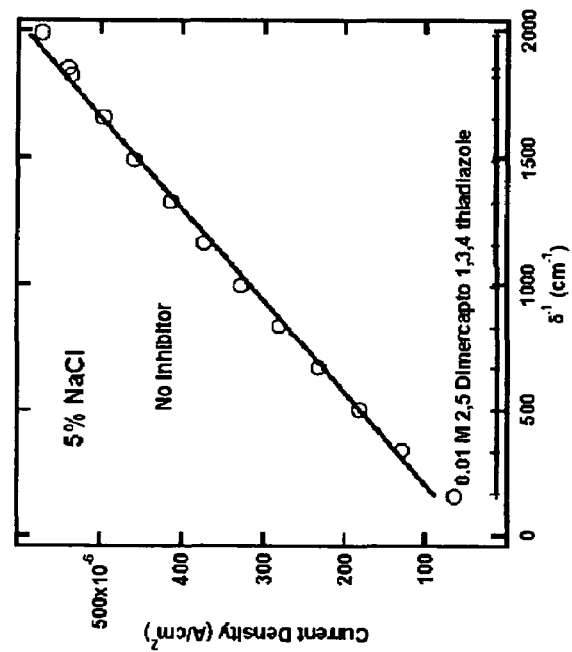

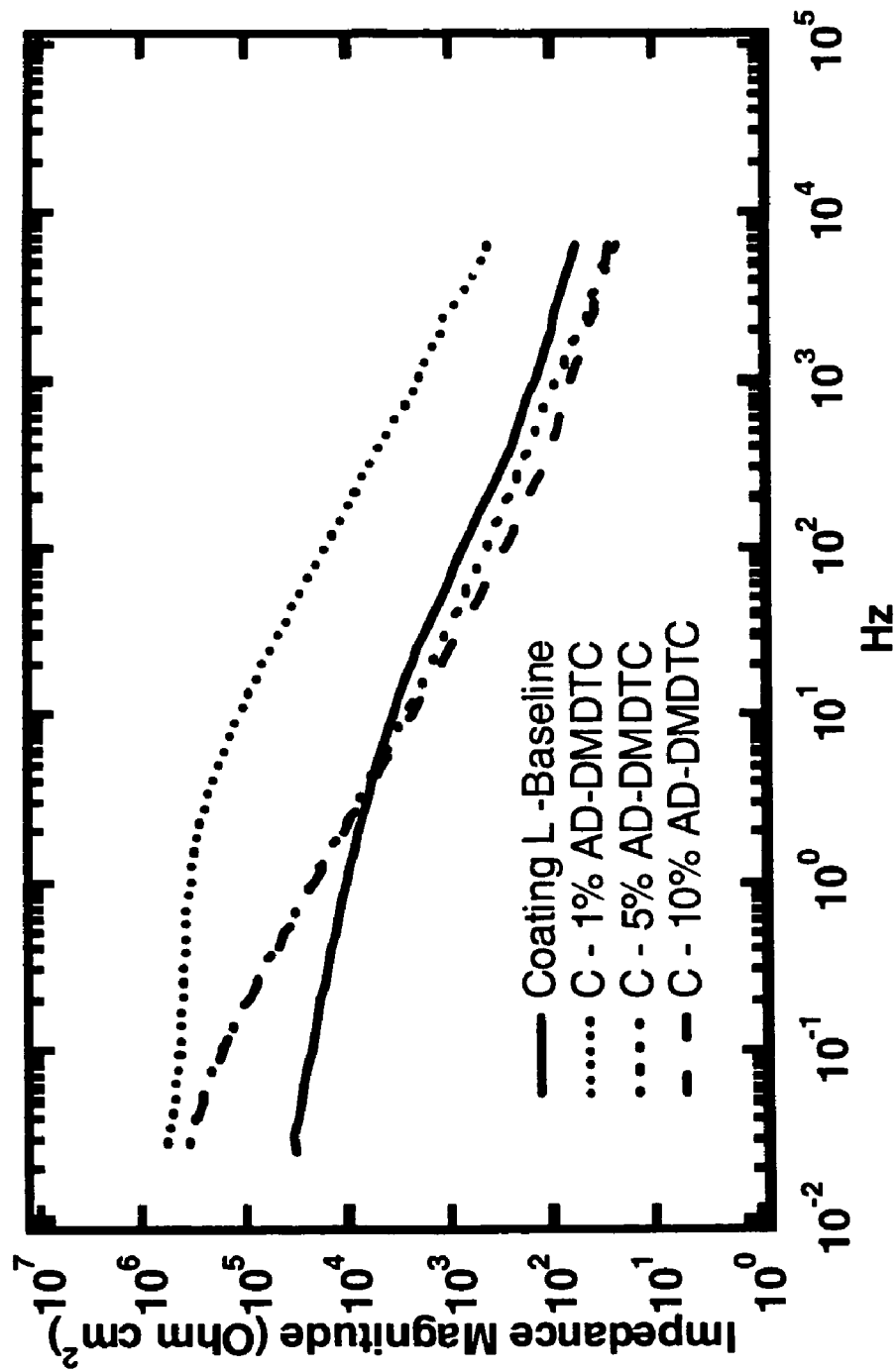

Table 1. Commercial Off the Shelf (COTS) CICs

| Code | Material | Manufacturer Supplier | Spec. | ρ, g/mL | VOC | η cSt | Film Former | Film color | Inhibitor, as rec'd |
|---|---|---|---|---|---|---|---|---|---|
| A | Dinitrol AV8™ | Chemetall | BMS 3-23G, Type II Class II Grade A | 0.88 | | 14-16 | Hydrotreated heavy petroleum Naphta | bronze | Calcium dinonyl naphthalene sulfonate, Barium alkyl sulfonate |
| Z | ZC023™ | Zip-Chem | BMS 23-3G, Type II, Class II, Grade B | 0.9 | 35 | 26 | Petroleum Naphtha | salmon | unknown |
| L | LPS3™ | LPS laboratories | BMS 23-3 | 0.83 | 75 | | Aliphatic hydrocarbon, Hydrotreated Peteroleum Oil | Color - less | Dipropylene glycol Monomethyl ether |

Table 7. Phase I Tests Performed

| Test | Test Method | Sample Material | Cleaning | Pre-Treatment |
|---|---|---|---|---|
| Rotating Electrode | -- | Al 2024-T3 bare | Solvent wipe, Brulin 815GD, Isoprep 44, Deoxalume 2300 | CIC coat per BMS3-35, 8.1e |
| Drying Time | BMS3-35 5.0, Table II | Al 2024-T3 bare | Solvent wipe, Brulin 815GD, Isoprep 44, Deoxalume 2300 | CIC coat per BMS3-35, 8.1e |
| Functional Penetration | BMS3-35 8.6.1 | Al 7075-T6 bare | Solvent wipe, Brulin 815GD, Isoprep 44, Deoxalume 2300 | Drill, bevel, alodine 1200, MP-85582 primed, coat |
| Neutral Salt Spray - penetration panel | BSS7249 | Al 2024-T3 bare | Solvent wipe, Brulin 815GD, Isoprep 44, Deoxalume 2300 | Drill, bevel, coat |
| Neutral Salt Spray - scribed flat panel | BSS7249 | Al 2024-T3 bare | Solvent wipe, Brulin 815GD, Isoprep 44, Deoxalume 2300 | CIC coat per BMS 3-35, 8.1e |
| Exfoliation Corrosion | ASTM G34/BMS3-23, 5.0 Table II | Al 2024-T3 bare | Solvent wipe, Brulin 815GD, Isoprep 44, Deoxalume 2300 | Drill, bevel, mask back CIC coat per 8.1e |
| Sandwich Corrosion | BAC5008 12.3 | Al 7075-T6 clad | Wipe w/MEK then acetone | -- |
| Water Immersion | BMS3-35 8.9 | Al 2024-T3 bare | Solvent wipe, Brulin 815GD, Isoprep 44, Deoxalume 2300 | CIC coat per BMS3-35, 8.1, dry 48+ hrs. |

Table 8. Phase I Sample Preparation

| Test | Test Method | Sample Material | Cleaning | Pre-Treatment |
|---|---|---|---|---|
| Rotating Electrode | -- | Al 2024-T3 bare | Solvent wipe, Brulin 815GD, Isoprep 44, Deoxalume 2300 | CIC coat per BMS3-35, 8.1e |
| Drying Time | BMS3-35 5.0, Table II | Al 2024-T3 bare | Solvent wipe, Brulin 815GD, Isoprep 44, Deoxalume 2300 | CIC coat per BMS3-35, 8.1e |
| Functional Penetration | BMS3-35 8.6.1 | Al 7075-T6 bare | Solvent wipe, Brulin 815GD, Isoprep 44, Deoxalume 2300 | Drill, bevel, alodine 1200, MP-85582 primed, coat |
| Neutral Salt Spray - penetration panel | BSS7249 | Al 2024-T3 bare | Solvent wipe, Brulin 815GD, Isoprep 44, Deoxalume 2300 | Drill, bevel, coat |
| Neutral Salt Spray - scribed flat panel | BSS7249 | Al 2024-T3 bare | Solvent wipe, Brulin 815GD, Isoprep 44, Deoxalume 2300 | CIC coat per BMS 3-35, 8.1e |
| Exfoliation Corrosion | ASTM G34/BMS3-23, 5.0 Table II | Al 2024-T3 bare | Solvent wipe, Brulin 815GD, Isoprep 44, Deoxalume 2300 | Drill, bevel, mask back CIC coat per 8.1e |
| Sandwich Corrosion | BAC5008 12.3 | Al 7075-T6 clad | Wipe w/MEK then acetone | -- |
| Water Immersion | BMS3-35 8.9 | Al 2024-T3 bare | Solvent wipe, Brulin 815GD, Isoprep 44, Deoxalume 2300 | CIC coat per BMS3-35, 8.1, dry 48+ hrs. |

| CIC | Inhibitor | % | hrs | Rcor | Log Rcor | Inh effectiveness multiplier IE | Ido/Id | Overall Factor IE*Ido/Id | Φ |
|---|---|---|---|---|---|---|---|---|---|
| A | none | 0 | 24 | 5.32E+06 | 6.73 | 1 | 1.0 | 1 | |
| C | none | 0 | 24 | 1.78E+04 | 4.25 | 1 | 1.0 | 1 | 0 |
| B | none | 0 | 24 | 3.89E+06 | 6.59 | 1 | 1.0 | 1 | |
| A | TOA+PYRR | 1 | 24 | 3.00E+06 | 6.48 | 1 | 0.8 | 0 | 0 |
| A | TOA+PYRR | 5 | 24 | 4.38E+07 | 7.64 | 8 | 2.1 | 17 | 11 |
| A | TOA+PYRR | 10 | 24 | 1.10E+07 | 7.04 | 2 | 2.6 | 5 | 0 |
| B | TOA+PYRR | 1 | 24 | 5.97E+07 | 7.78 | 15 | 0.8 | 12 | 0 |
| B | TOA+PYRR | 5 | 24 | 1.51E+08 | 8.18 | 39 | 2.1 | 81 | 96 |
| B | TOA+PYRR | 10 | 24 | 1.54E+09 | 9.19 | 395 | 2.6 | 1028 | 2249 |
| A | TOA+DMT | 1 | | 7.06E+06 | 6.85 | 1 | 1.3 | 2 | 0 |
| A | TOA+DMT | 5 | | 1.70E+06 | 6.23 | 0 | 1.6 | 1 | 0 |
| A | TOA+DMT | 10 | | 1.96E+06 | 6.29 | 0 | 1.7 | 1 | 0 |
| B | TOA+DMT | 1 | | 9.61E+07 | 7.98 | 25 | 1.2 | 30 | 0 |
| B | TOA+DMT | 5 | | 1.24E+07 | 7.09 | 3 | 1.6 | 5 | 0 |
| | | | | | | | 1.0 | 0 | 0 |
| A | AD+DMDTC | 1 | 24 | 2.32E+06 | 6.37 | 0 | 2.8 | 1 | 0 |
| A | AD+DMDTC | 5 | 24 | 3.91E+06 | 6.59 | 1 | 3.6 | 3 | 0 |
| A | AD+DMDTC | 10 | 24 | 9.37E+06 | 6.97 | 2 | 3.1 | 5 | 0 |
| C | AD+DMDTC | 5 | 24 | 1.62E+05 | 5.21 | 9 | 3.9 | 36 | 0 |
| C | AD+DMDTC | 10 | 24 | 1.22E+06 | 6.09 | 69 | 11.5 | 788 | 0 |
| B | AD+DMDTC | 1 | 24 | 1.12E+07 | 7.05 | 3 | 1.2 | 3 | 0 |
| B | AD+DMDTC | 5 | 24 | 1.57E+07 | 7.20 | 4 | 3.3 | 13 | 3 |
| B | AD+DMDTC | 10 | 24 | 2.17E+06 | 6.34 | 1 | 8.2 | 5 | 0 |
| A | Zn Stearate | 1 | 24 | 4.43E+06 | 6.65 | 1 | 0.9 | 1 | 0 |
| A | Zn Stearate | 5 | 24 | 3.75E+07 | 7.57 | 7 | 0.8 | 6 | 0 |
| A | Zn Stearate | 10 | 24 | 5.66E+07 | 7.75 | 11 | 0.8 | 9 | 0 |
| C | Zn Stearate | 1 | | 1.38E+06 | 6.14 | 78 | 0.8 | 62 | 0 |
| C | Zn Stearate | 5 | | 9.54E+05 | 5.98 | 54 | 0.8 | 43 | 0 |
| C | Zn Stearate | 10 | | 1.64E+06 | 6.22 | 92 | 0.8 | 73 | 0 |
| B | Zn Stearate | 1 | | 8.24E+08 | 8.92 | 212 | 0.9 | 184 | 0 |
| B | Zn Stearate | 5 | | 8.90E+07 | 7.95 | 23 | 0.8 | 19 | 0 |
| B | Zn Stearate | 10 | | 1.60E+08 | 8.20 | 41 | 0.8 | 34 | 0 |
| A | 5% Zn stearate 5% TOA+PYRR | 10 | | 1.38E+06 | 6.14 | 0 | 2.0 | 1 | 0 |
| C | 5% Zn stearate 5% TOA+PYRR | 10 | | 1.26E+06 | 6.10 | 71 | 1.8 | 131 | 0 |
| B | 5% Zn stearate 5% TOA+PYRR | 10 | | 7.37E+08 | 8.87 | 189 | 2.3 | 430 | 803 |
| B | 5% Zn stearate, 5% AD+DMDTC | 10 | | 3.84E+07 | 7.58 | 10 | 2.7 | 27 | 16 |
| C | 5% Zn stearate, 5% AD+DMDTC | 10 | | 2.79E+06 | 6.45 | 157 | 1.8 | 289 | 0 |
| A | 5% Zn stearate, 5% AD+DMDTC | 10 | | 7.46E+06 | 6.87 | 1 | 1.7 | 2 | 0 |
| C | 3.3%TOA+PYRRR, 3.3% znstearate 3.3% AD-phosphate | 10 | | 4.50E+05 | 5.65 | 25 | 2.6 | 65 | 0 |
| A | 3.3%TOA+PYRRR, 3.3% znstearate 3.3% AD-phosphate | 10 | | 3.64E+06 | 6.56 | 1 | 1.7 | 1 | 0 |
| B | 3.3%TOA+PYRRR, 3.3% znstearate 3.3% AD-phosphate | 10 | | 7.78E+06 | 6.89 | 2 | 2.1 | 4 | 0 |
| B | 3.3% AD+DMDTC, 3.3% znstearate 3.3% AD-phosphate | 10 | | 1.37E+06 | 6.14 | 0 | 1.0 | 0 | 0 |
| C | 3.3% AD+DMDTC, 3.3% znstearate 3.3% AD-phosphate | 10 | | 8.01E+06 | 6.90 | 450 | 10.2 | 4613 | 0 |
| A | 3.3% AD+DMDTC, 3.3% znstearate 3.3% AD-phosphate | 10 | | 7.59E+06 | 6.88 | 1 | 1.4 | 2 | 0 |

Addogen + dimethyl-dithio-carbamate = AD+ DMDTC
Tri-octyl-amine + dimercaptothiadiazole = TOA+DMT Appendix 1

US 7,686,980 B2

CORROSION INHIBITORS, METHODS OF PRODUCTION AND USES THEREOF

FIELD OF THE INVENTION

The field of the subject matter herein is corrosion inhibitors, methods of production and uses thereof, specifically, active corrosion inhibitors that either react with a surface or adjacent layer to slow corrosion reactions or that release corrosion inhibitors "on demand".

BACKGROUND

Surface weathering and erosion as a result of environmental exposure is a key area of research for any corporation, research facility or government entity that purchases or produces products that can corrode as a result of that exposure to the environment. If the impact of environmental exposure can be significantly decreased from the initial production of the product and throughout its useful lifetime, it will lower the total cost of ownership for the corporation, research facility or government entity.

Sprayable organic corrosion preventative or protective compounds (CPCs) that penetrate crevices and faying surfaces and leave a flexible, waxy, waterdisplacing layer have extended the time between corrosion rework, thereby lowering the impact of environmental exposure. Experiments in the field have shown that CPCs release only marginally effective corrosion inhibitors, as compared to the release of inhibitors provided by primers and conversion coatings. CPCs primarily act to displace and repel water without any significant chemical reaction with the corrosive or potentially corrosive elements.

Aluminum alloy corrosion inhibitors, such as chromate, inhibit corrosion by slowing the rate of the oxygen reduction reaction (ORR) at local cathodes on the alloy surface (W. J. Clarke and R. L. McCreery, *J. Electrochem. Soc.*, 149, B379 (2002) and W. J. Clarke, J. D. Ramsey, R. L. McCreery, G. S. Frankel, *J. Electrochem. Soc.*, 149,B 179 (2002)). As schematically shown in Prior Art FIG. 1, the copper (Cu) rich intermetallics in high strength aluminum alloys 110 form active cathodes at the intermetallics or through dissolution and redeposition of Cu 120 to adjacent surfaces 100 (R. G. Buchheit, M. A. Martinez, L. P. Montes, *J. Electrochem. Soc.*, 146(12), 4424 (1999)).

U.S. Pat. 4,226,624 issued to Ohr (Oct. 7, 1980) addresses the issue of corrosion of metallic structures. Specifically, Ohr found that utilizing inorganic salts—such as chromates—will reduce the incidence of corrosion in these metallic structures. The problem with the use of inorganic salts is that they don't dissolve in organic materials such as paints or plastics. Therefore, modifying the structure of the inorganic salts to include organic substituents may make them more soluble in these coatings and materials. Ohr utilizes organo-substituted quarternary ammonium salts in order to facilitate the incorporation of these compounds into organic materials. The inorganic salts must be substituted with organic moieties in order to make them soluble in other organic materials. One consideration in this approach is that chromates can pose an unacceptable environmental risk.

Based on the drawbacks, disadvantages and cost issues of environmental exposure for corrodible surfaces and products, it would be useful to develop and implement active corrosion inhibitors and compositions/materials that contain those inhibitors that a) are incorporatable into coatings, paints and other products utilized in protecting corrodible materials; b) are compatible with conventional corrosion inhibitor compounds (CICs) or corrosion protective compounds (CPCs); c) react with structural surfaces to slow corrosion; d) can transport or facilitate transportation of corrosion inhibitors to the corrosion site "on demand" as triggered by the presence of corrosive conditions; and e) is an acceptable additive with respect to not posing unnecessary environmental risks. If these types of compositions that contain both an active corrosion inhibitor and a conventional CIC or CPC can be developed, they could extend what is currently considered the useful life of conventional CICs or CPCs in products that incorporate corrodible surfaces.

SUMMARY OF THE SUBJECT MATTER

Compositions for actively inhibiting corrosion are described herein that include at least one active corrosion inhibitor compound, and at least one conventional corrosion inhibitor compound.

In addition, methods for producing a composition that actively reduces corrosion are described herein and include providing at least one active corrosion inhibitor, providing at least one conventional corrosion inhibitor compound or corrosion protection compound, and blending the at least one active corrosion inhibitor and the at least one conventional corrosion inhibitor compound or corrosion protection compound to form the composition.

In addition, a composition for actively inhibiting corrosion is described herein that includes at least one active corrosion inhibitor compound, wherein the at least one active corrosion inhibitor compound comprises a derivative or salt of a thio-, thia- or dithiocarbamic acid, or a combination thereof and at least one conventional corrosion inhibitor compound.

Coatings and composite materials containing these active corrosion inhibitor compounds and compositions are also described.

BRIEF DESCRIPTION OF THE FIGURES, TABLES & APPENDICES

Prior Art FIG. 1: Schematic view of intermetallic deposition on a surface.

FIG. 2: Structures of several contemplated inhibiting species. Abbreviations are shown in Appendix 2.

Figure 3:
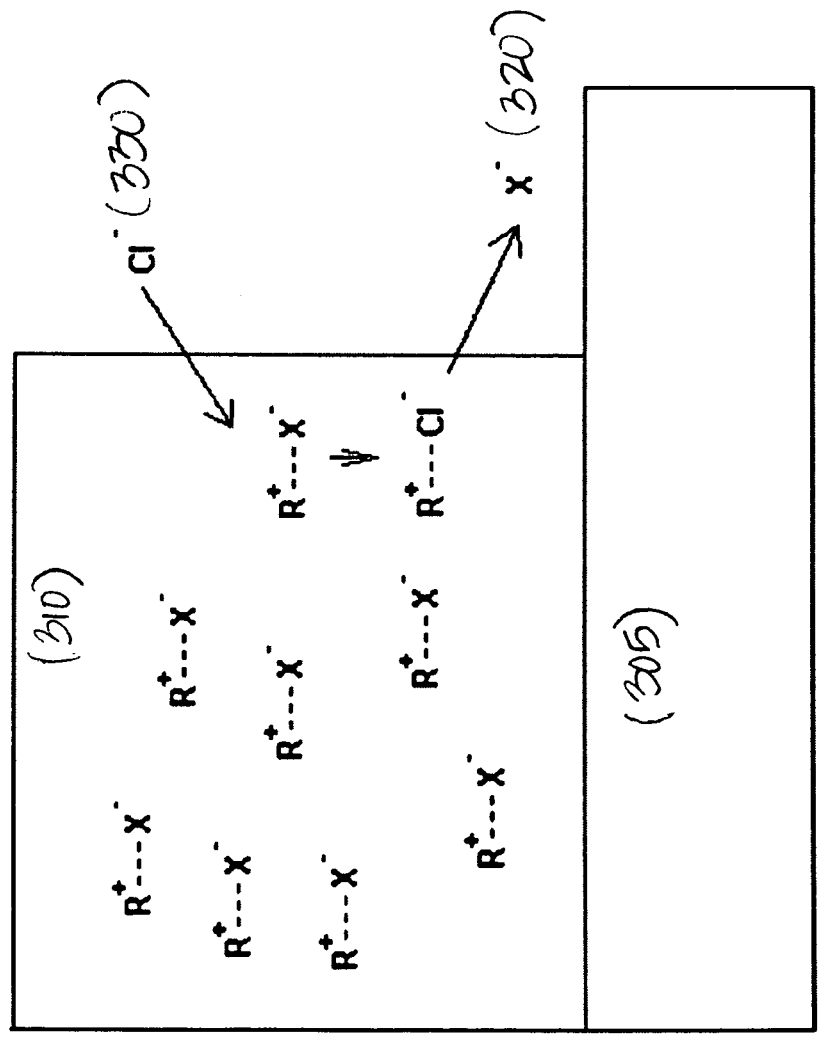

FIG. 3: Shows a contemplated mechanism of corrosion inhibition.

Figure 4A:
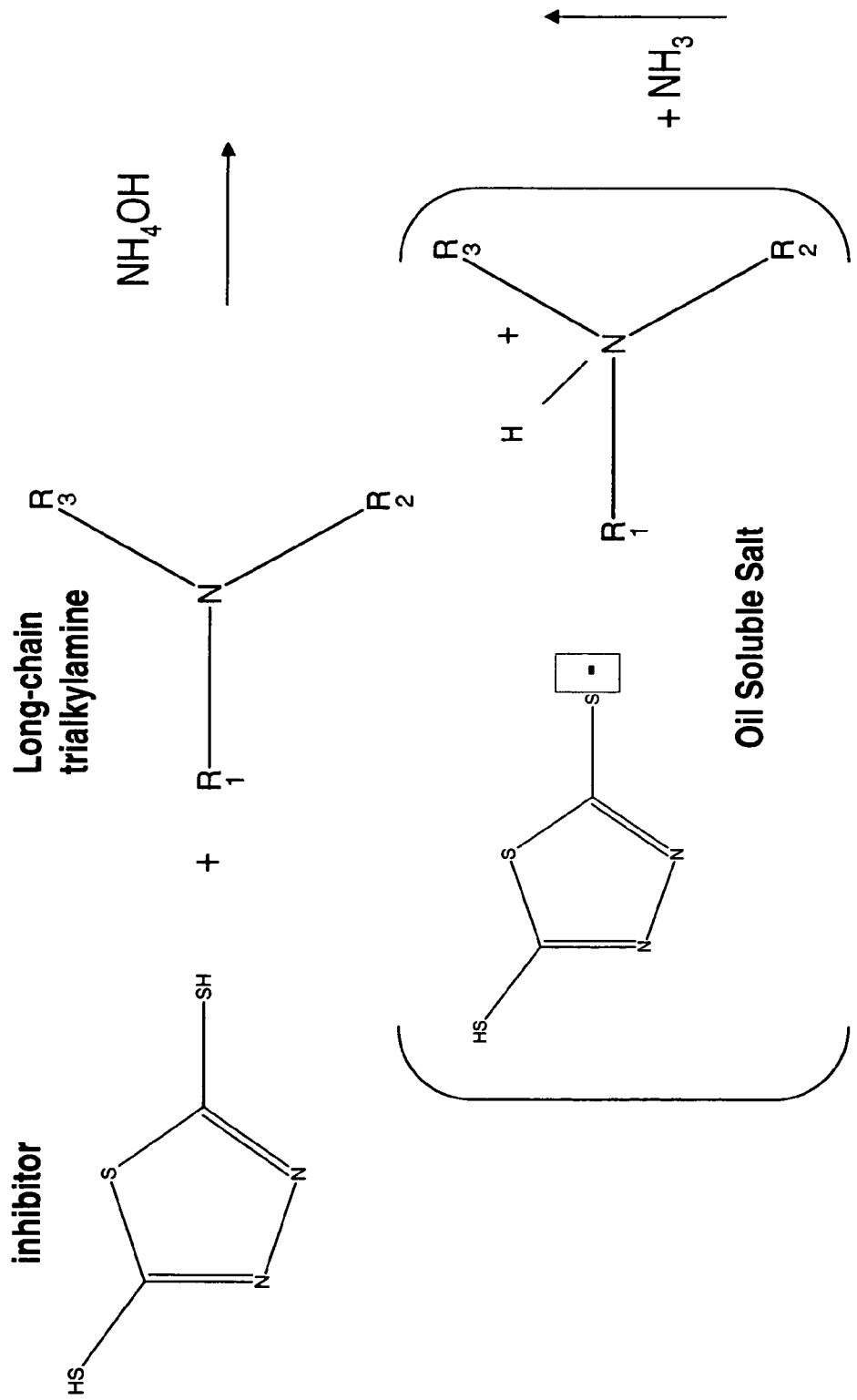

FIG. 4A: Shows a generic synthesis of contemplated salts containing contemplated inhibitors.

Figure 4B:
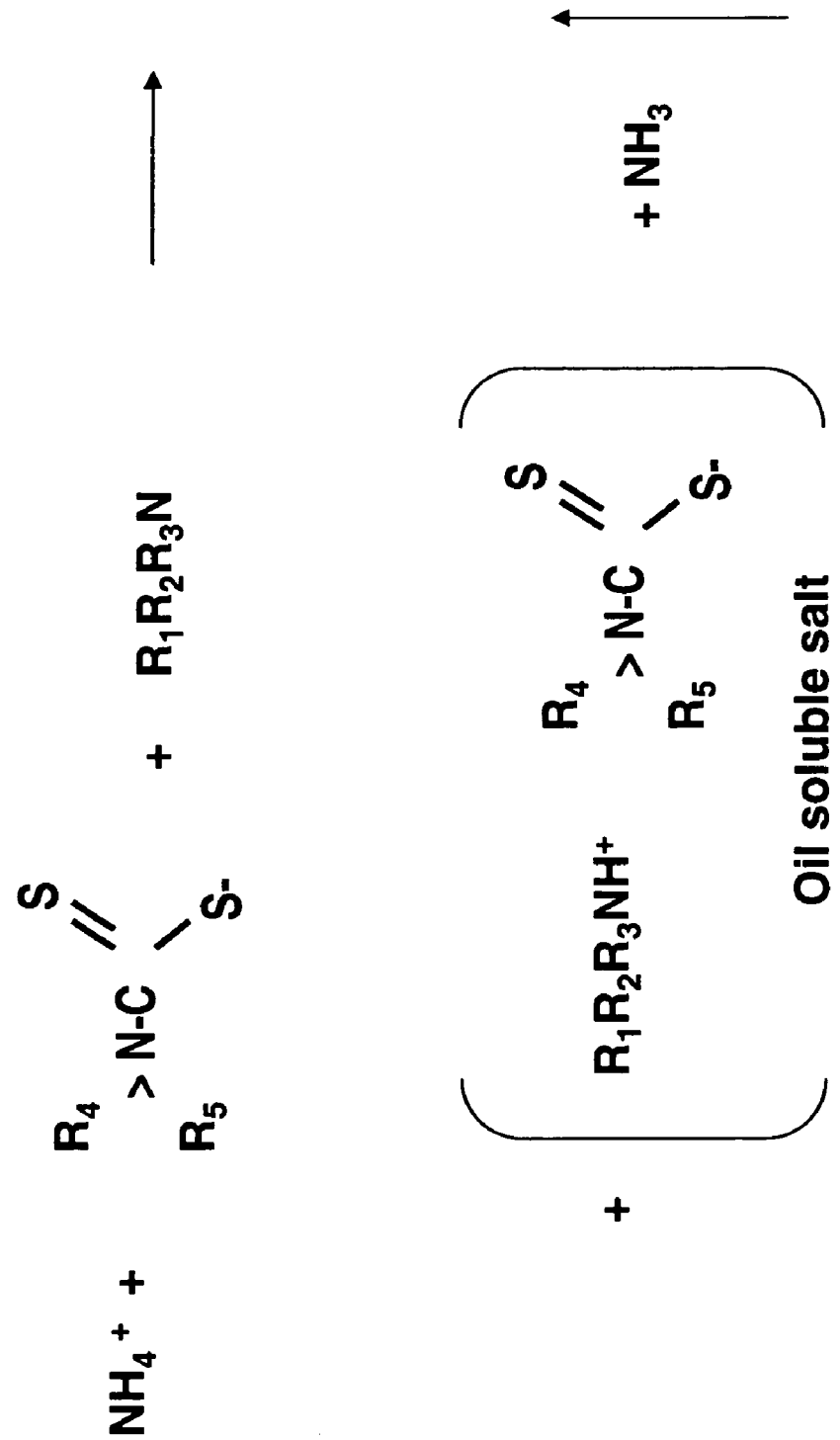

FIG. 4B: Shows a generic synthesis of contemplated salts containing contemplated inhibitors.

Figure 5:
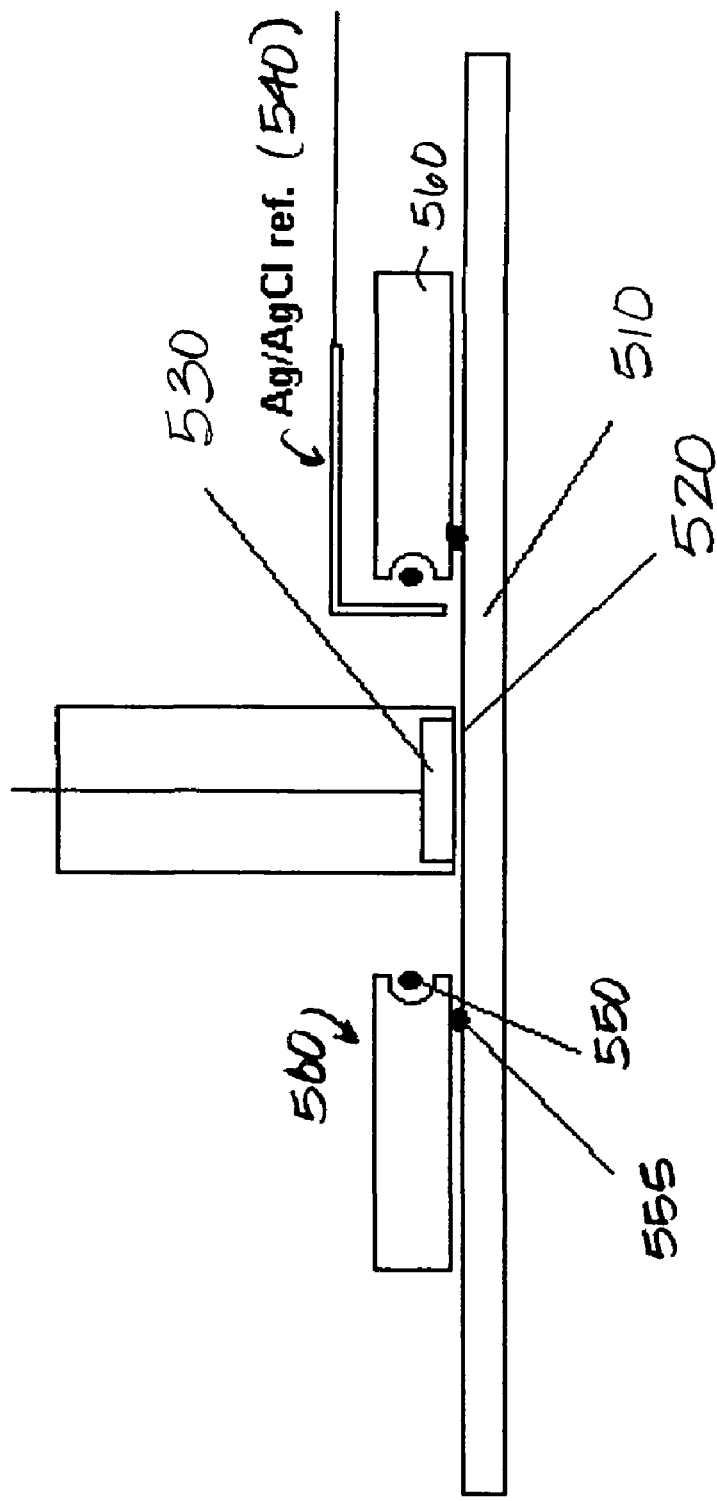

FIG. 5: Equipment used in several of the studies shown in the Examples Section.

FIG. 6: Current density for the reduction of oxygen at a Cu RDE as a function of the inverse diffusion length. As shown, acidic compounds can be deprotonated to form an anion, and anions in combination with alkyl ammonium complexes are soluble in CPCs or CICs.

Figure 7:
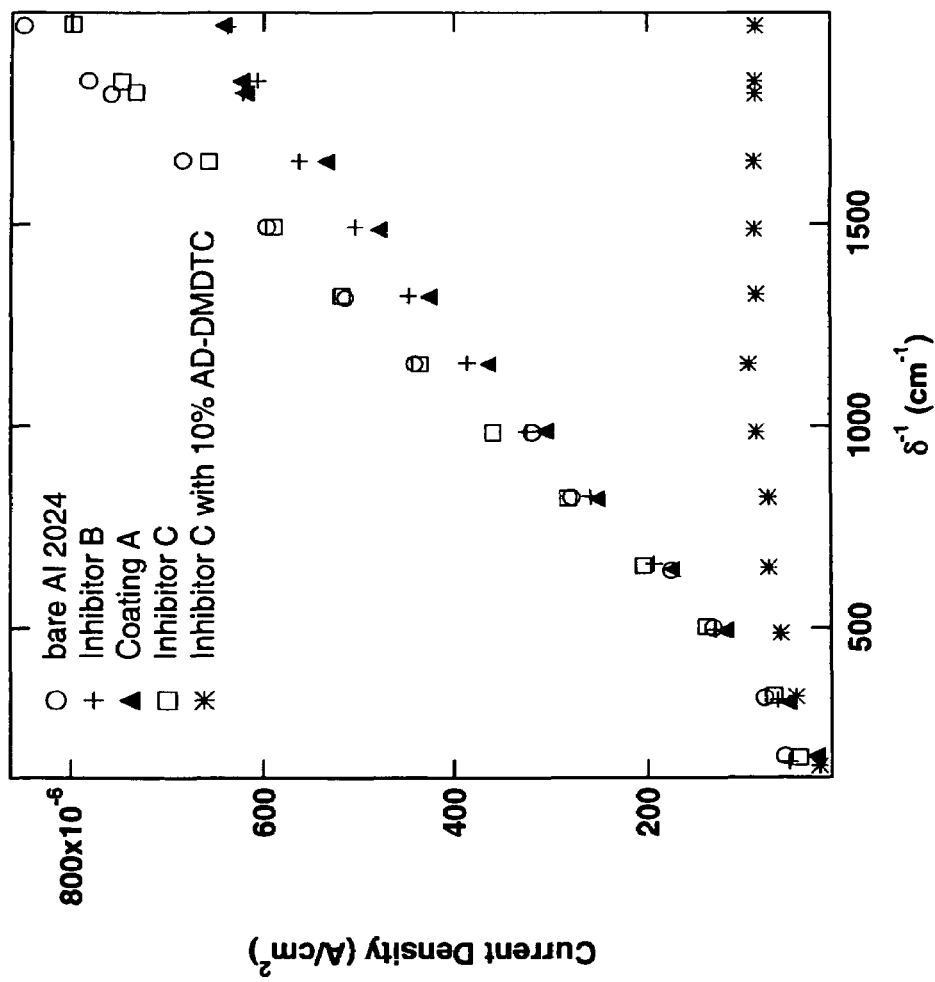

FIG. 7: ORR currents as a function of inverse diffusion length for the RDE.

FIG. 8A: Typical impedance spectra.

Figure 8B:
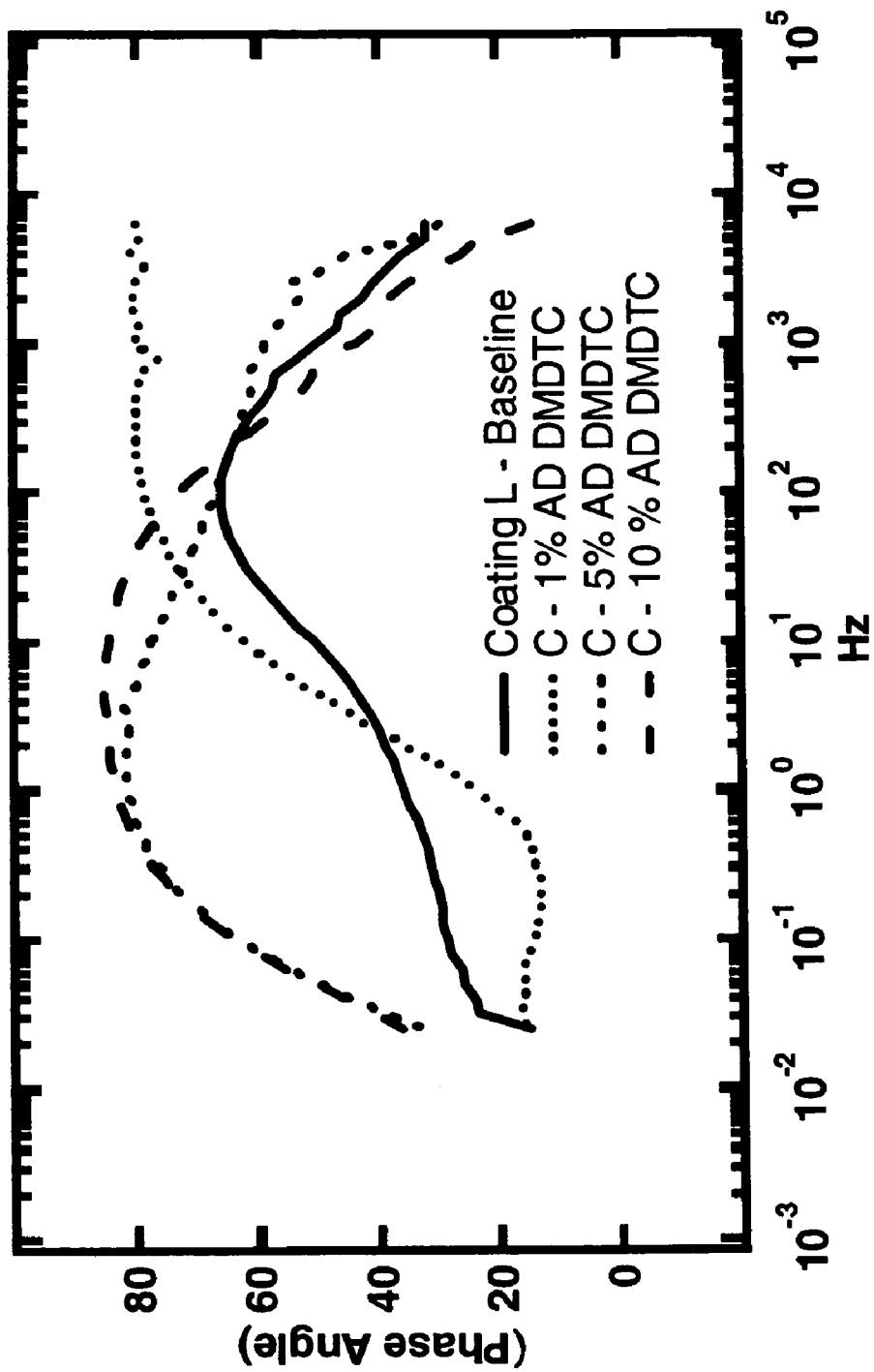

FIG. 8B: Typical impedance spectra.

Figure 9:
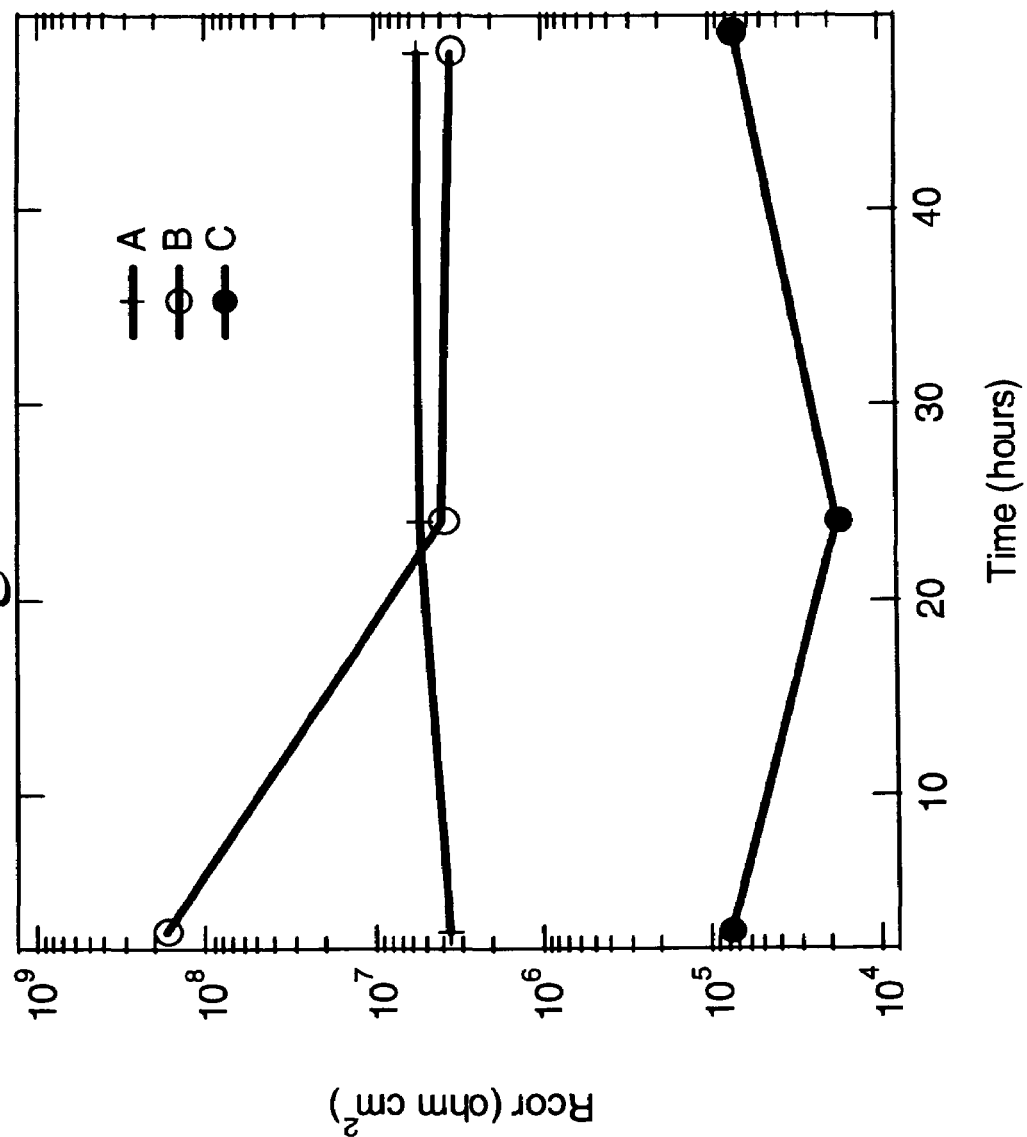

FIG. 9: Graph showing impedance behavior achieving a steady state behavior.

Figure 10:
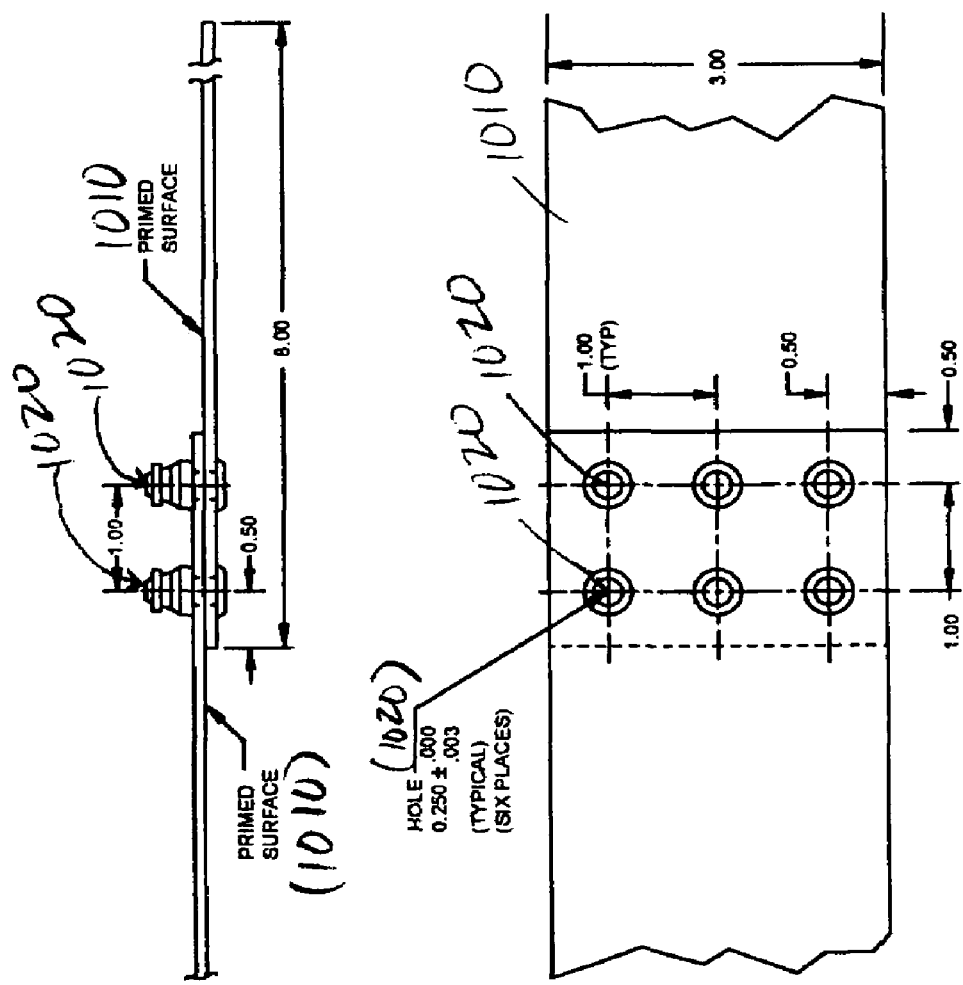

FIG. 10: Panels drilled to the pattern of BMS 3-29.

Figure 11:
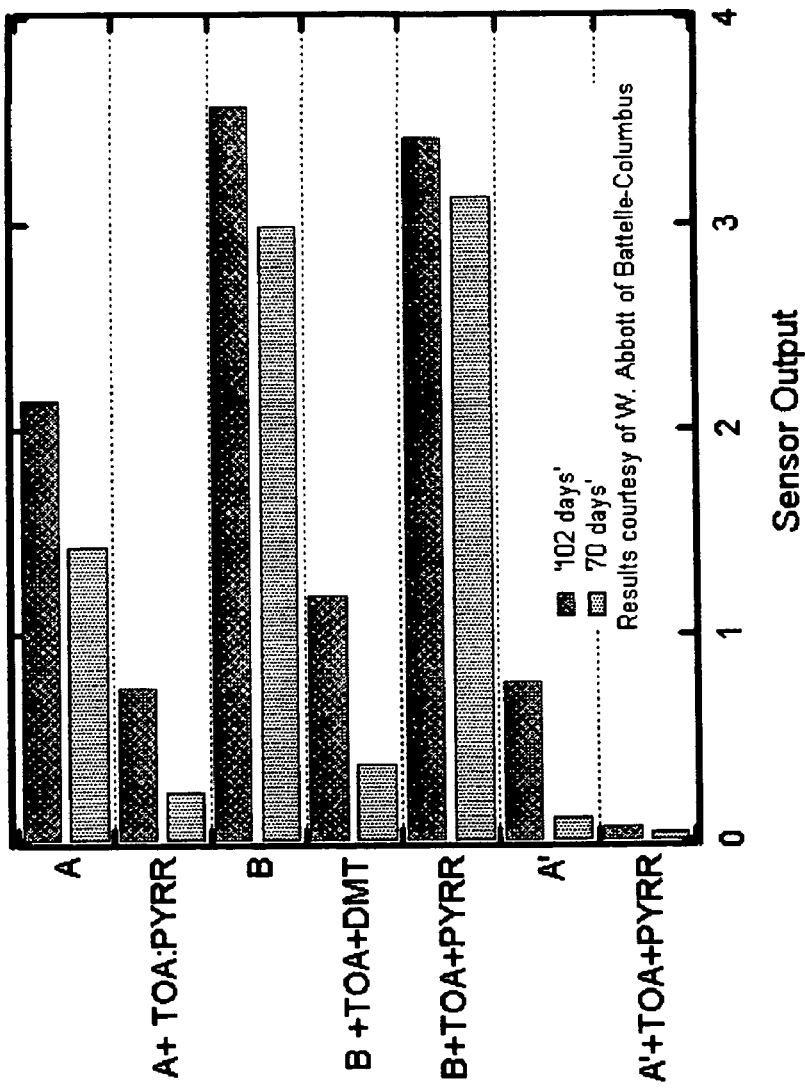

FIG. 11: Shows the 70-day and 102-day results.

Table 1: Commercial Off-The-Shelf (COTS) CICs.

Table 2: Baseline commercial CICs or CPCs used in several of the studies shown in the Examples Section.

Table 3: Phase I inhibitor compositions.
Table 4: Phase II inhibitor compositions.
Table 5: Formulations submitted for outdoor exposure at Daytona Beach site.
Table 6: Performance Requirements (BMS3-23).
Table 7: Phase I tests performed.
Table 8: Phase I sample preparation.
Table 9: Results for the drying time test.
Table 10: Results for the functional penetration test.
Table 11: Results for Phase I exfoliation solution exposure test.
Table 12: Results of the sandwich corrosion test.
Table 13: Results of the water immersion test.
Table 14: Shows the Phase II test matrix.
Table 15: Data for the solution pH and replacement schedule
Appendix 1: Summary of data used on specimens shown in the Examples Section.
Appendix 2: Abbreviations used in the current disclosure.

DETAILED DESCRIPTION

Active corrosion inhibitors and compositions/materials that contain those inhibitors have been surprisingly discovered and developed that a) are incorporatable into coatings, paints and other products utilized in protecting corrodible materials; b) are compatible with conventional corrosion inhibitor compounds (CICs) and/or corrosion protection compounds (CPCs); c) react with structural surfaces to slow corrosion; d) can transport or facilitate transportation of corrosion inhibitors to the corrosion site "on demand" as triggered by the presence of corrosive conditions; and e) is an acceptable additive with respect to not posing unnecessary environmental risks. Contemplated compositions that contain both an active corrosion inhibitor and a conventional CIC or CPC can extend what is currently considered the useful life of conventional CICs or CPCs in products that incorporate corrodible surfaces and/or materials.

A composition that comprises at least one active corrosion inhibitor compound and at least one conventional corrosion inhibitor compound and/or corrosion protection compound is contemplated herein. It is contemplated that the at least one active corrosion inhibitor and the at least one conventional corrosion inhibitor compound are different chemical compounds. As mentioned later, the at least one active corrosion inhibitor compound and at least one conventional corrosion inhibitor compound and/or corrosion protection compound may comprise the same or similar elements/atoms, but they are different, distinct chemical compounds. For example, the at least one active corrosion inhibitor compound may comprise salts of dimethyldithiocarbamate (DMDTC) and the at least one conventional corrosion inhibitor compound and/or corrosion protection compound may comprise calcium dinonyl naphthalene sulfonate. Both compounds in this example contain sulfur, but they are two distinct chemical compounds.

Methods of producing these compositions include providing at least one active corrosion inhibitor, providing at least one conventional corrosion inhibitor compound and/or corrosion protection compound and blending the at least one active corrosion inhibitor and the at least one conventional corrosion inhibitor compound and/or corrosion protection compound to form the composition. In some embodiments, solvents may be added to the composition to improve the composition's ability to form a coating material or to be incorporated into another material. Solvents may also be added to facilitate blending of the different inhibitor species.

In addition, a composition for actively inhibiting corrosion is described herein that includes at least one active corrosion inhibitor compound, wherein the at least one active corrosion inhibitor compound comprises a derivative or salt of a thio-, thia- or dithiocarbamic acid, or a combination thereof and at least one conventional corrosion inhibitor compound.

Contemplated solvents to be utilized in the solvent system are those that include any suitable pure or mixture of organic or inorganic molecules that are volatilized at a desired temperature and/or easily solvates the chosen inhibitors and/or other molecules/compositions/materials discussed herein. Contemplated solvents are also those solvents that can, alone or in combination, improve the composition's ability to form a coating material or to be incorporated into another material and/or facilitate blending of the different inhibitor species. The solvent may also comprise any suitable pure or mixture of polar and non-polar compounds. As used herein, the term "pure" means that component that has a constant composition. For example, pure water is composed solely of H20. As used herein, the term "mixture" means that component that is not pure, including salt water. As used herein, the term "polar" means that characteristic of a molecule or compound that creates an unequal charge, partial charge or spontaneous charge distribution at one point of or along the molecule or compound. As used herein, the term "non-polar" means that characteristic of a molecule or compound that creates an equal charge, partial charge or spontaneous charge distribution at one point of or along the molecule or compound.

In some contemplated embodiments, the solvent or solvent mixture may comprise those solvents that are not considered part of the hydrocarbon solvent family of compounds, such as ketones, such as acetone, diethyl ketone, methyl ethyl ketone and the like, alcohols (branched and straight chain, such as 2-propanol or 1-propanol), esters, ethers, ether acetates and amines. In yet other contemplated embodiments, the solvent or solvent mixture may comprise a combination of any of the solvents mentioned herein.

In other contemplated embodiments, the solvent or solvent mixture (comprising at least two solvents) comprises those solvents that are considered part of the hydrocarbon family of solvents. Hydrocarbon solvents are those solvents that comprise carbon and hydrogen. It should be understood that a majority of hydrocarbon solvents are non-polar; however, there are a few hydrocarbon solvents that could be considered polar. Hydrocarbon solvents are generally broken down into three classes: aliphatic, cyclic and aromatic. Aliphatic hydrocarbon solvents may comprise both straight-chain compounds and compounds that are branched and possibly crosslinked, however, aliphatic hydrocarbon solvents are not considered cyclic. Cyclic hydrocarbon solvents are those solvents that comprise at least three carbon atoms oriented in a ring structure with properties similar to aliphatic hydrocarbon solvents. Aromatic hydrocarbon solvents are those solvents that comprise generally three or more unsaturated bonds with a single ring or multiple rings attached by a common bond and/or multiple rings fused together. Contemplated hydrocarbon solvents include toluene, xylene, p-xylene, m-xylene, mesitylene, solvent naphtha H, solvent naphtha A, alkanes, such as pentane, hexane, isohexane, heptane, nonane, octane, dodecane, 2-methylbutane, hexadecane, tridecane, pentadecane, cyclopentane, 2,2,4-trimethylpentane, petroleum ethers, halogenated hydrocarbons, such as chlorinated hydrocarbons, nitrated hydrocarbons, benzene, 1,2-dimethylbenzene, 1,2,4-trimethylbenzene, mineral spirits, kerosine, isobutylbenzene, methylnaphthalene, ethyltoluene, ligroine. Particularly contemplated solvents include, but are not limited to, pentane, hexane, heptane, cyclohexane, benzene, toluene, xylene and mixtures or combinations thereof.

Conventional corrosion inhibitor compounds are those compounds that release only marginally effective corrosion inhibitors, if any, and function mainly to displace water and provide a barrier to corrosives. Examples of conventional corrosion inhibitor compounds include calcium dinonyl naphthalene sulfonate, barium alkyl sulfonate and dipropylene glycol monomethyl ether. Some specifications of these conventional corrosion inhibitor compounds (aka Commercial Off The Shelf or COTS) are shown in Table 1.

Active corrosion inhibitors may comprise any compound that reacts with structural surfaces or adjacent layers to slow corrosion and/or transports or facilitate transportation of corrosion inhibitors to the corrosion site "on demand" as triggered by the presence of corrosive conditions. Contemplated active corrosion inhibitors include sulfur-containing compounds, derivatives or salts of carbamic acid, derivatives or salts of thio-, thia- or dithiocarbamic acid, salts of a thiadiazole compound, soluble thiadiazole salts, soluble dithiocarbamate salts, or combinations and mixtures thereof. It should be understood that although barium alkyl sulfonate is a sulfur-containing compound that it is not an active corrosion inhibitor, because it does not react with structural surfaces or adjacent layers to slow corrosion and/or transport or facilitate transportation of corrosion inhibitors to the corrosion site "on demand" as triggered by the presence of corrosive conditions. In some embodiments, contemplated active corrosion inhibitors include organic-soluble alkylammonium salt of a dithiocarbamate and related bases. For example, several contemplated active corrosion inhibitors include salts of dimethyldithiocarbamate (DMDTC), 2,5-dimercapto-1,3,4-thiadiazole (DMT) and pyrrolidine dithiocarbamate (PYRR), which is an anion of CAS 5108-96-3. FIG. 2 shows structures of these inhibiting species. In some embodiments, in order to dissolve these ionic compounds in the aliphatic hydrocarbon phases of the CICs or CPCs, salts were synthesized with long chain aliphatic ammonium and amine compounds as cations.

A contemplated mechanism of corrosion inhibition proposed for these phase-transfer phase-catalyzed compounds appears in FIG. 3. The coating 310 on substrate or adjacent layer 305 effectively becomes an anion exchange material that releases the inhibiting anion 320 in the presence of a high activity of a corrodant anion such as chloride 330. Hence, an inhibiting species 320 is released and chloride activity reduced.

Generic syntheses of some contemplated salts containing several of the contemplated active corrosion inhibitor compositions are shown in FIGS. 4A and 4B. This approach provides the basis for the preparations and compositions shown in the Examples section. These salts are formed in these embodiments in order to dissolve contemplated active corrosion inhibitor compounds (ionic compounds) in the aliphatic hydrocarbon phases of the CICs. As shown in FIGS. 4A and 4B, the ionic compounds are synthesized with long chain aliphatic ammonium and amine compounds as cations.

In contemplated embodiments, the amount of active corrosion inhibitor added to the composition or coating material and/or added to form contemplated salts is that amount suitable to provide the anion exchange effect previously described and desired. In some embodiments, the amount of active corrosion inhibitor added to the composition is less than about 20 weight percent. In other embodiments, the amount of active corrosion inhibitor added to the composition is less than about 10 weight percent. In yet other embodiments, the amount of active corrosion inhibitor added to the composition is less than about 5 weight percent. And in some embodiments, the amount of active corrosion inhibitor added to the composition is less than about 3.3 weight percent.

The compositions that comprise at least one active corrosion inhibitor and at least one conventional corrosion inhibitor compound and/or corrosion protection compound release oxygen reduction reaction (ORR) inhibitors upon exposure to a corrosive electrolyte as evidenced by the ability of the coating to inhibit the ORR at a well-defined cathode placed adjacent to the coated surface.

These compositions may be used as or incorporated into coating materials or composite materials. If the compositions are utilized in coating materials, then the coating material will be applied to or used in conjunction with a corrodible surface. In some embodiments, the entire surface may be corrodible and in other embodiments only part of the surface is corrodible—such as with those surfaces that comprise circuit patterns or other patterned metals and/or metal alloys.

Corrodible surfaces include any surface that corrodes upon or after reaction with the surrounding environment. In general, corrodible surfaces will comprises at least one metal or metal alloy. As used herein, the term "metal" means those elements that are in the d-block and f-block of the Periodic Chart of the Elements, along with those elements that have metal-like properties, such as silicon and germanium. As used herein, the phrase "d-block" means those elements that have electrons filling the 3d, 4d, 5d, and 6d orbitals surrounding the nucleus of the element. As used herein, the phrase "f-block" means those elements that have electrons filling the 4f and 5f orbitals surrounding the nucleus of the element, including the lanthanides and the actinides. Preferred metals include indium, silver, copper, aluminum, tin, bismuth, gallium and alloys thereof, silver coated copper, and silver coated aluminum. The term "metal" also includes alloys, metal/metal composites, metal ceramic composites, metal polymer composites, as well as other metal composites.

Coating materials may be applied by any suitable manner or apparatus, including hand coating; screen printing, ink jet printing, thread dispensing; spraying; stamping; all types of lithography or wet offset; roller printing; letter press printing; gravure printing; flexographic printing; planographic printing; spin-on applications; offset printing; mimeo graphic printing; thermography; hot stamping and transfer printing techniques; as well as brushing and stenciling techniques. In short, any printing or dispensing process that can distribute a coating material can be employed effectively with embodiments of the present teachings.

In another embodiment, a composition that comprises at least one active corrosion inhibitor and at least one conventional corrosion inhibitor compound and/or corrosion protection compound may be incorporated directly into a material that also comprises corrodible elements. In these embodiments, this material may then be formed into a surface or component and may also become a coating composition for another surface that may or may not comprise corrodible elements.

EXAMPLES

Commercially available CICs or CPCs, such as those listed in Table 2, form the baseline of the formulations tested. Inhibitors were dissolved in these baseline formulations at various levels. In Table 2, BMS stands for Boeing Material Specification.

TABLE 2

| BASE CIC | Spec. | ρ, g/mL | VOC | η cSt | Film Former | Film Color | Inhibitor, as rec'd |
|---|---|---|---|---|---|---|---|
| A | BMS 3-23G, Type II Class II Grade A | 0.88 | | 14-16 | Hydrotreated heavy petroleum Naphta | Bronze | Calcium dinonyl naphthalene sulfonate, Barium alkyl sulfonate |
| B | BMS 23-3G, Type II, Class II, Grade B | 0.9 | 35 | 26 | Petroleum Naphtha | Salmon | Unknown |
| C | BMS 23-3 | 0.83 | 75 | | Aliphatic hydrocarbon, Hydrotreated Peteroleum Oil | Colorless | Dipropylene glycol Monomethyl ether |

ADOGEN® dimethyldithiocarbamate (AD+DMDTC) was synthesized by mixing 10% of ADOGEN®464 (AD), which is a registered trademark of Ashland Chemical Company and refers to methyl trialkyl ($C_8$-$C_{10}$) ammonium chloride (CAS 72749-59-8), and 0.3 M sodium dimethyldithiocarbamate (DMDTC), both in dehydrated ethanol. The mixture was stirred in a closed container and allowed to react overnight. Under a water-free environment, NaCl precipitated and was filtered off. The filtrate was purged with a stream of nitrogen to evaporate remaining ethanol until an oily product resulted.

Trioctylammonium (TOA) analog of 2,5-dimercapto-1,3,4-thiadiazole (DMT) was made using a 2:1 molar ratio TOA:DMT. DMT was added directly to the trioctylamine (TOA) and stirred overnight. If a two-phase product resulted, the upper clear colorless phase was discarded and the oily phase in the bottom was collected for use.

To make the trioctylammonium analog of ammonium pyrrolidine dithioacarbamate (PYRR), a 1:1 molar ratio of trioctylamine (TOA) and PYRR was used. PYRR was dissolved in a small amount of ethanol; then trioctylamine was added. The solution was stirred in an open flask and heated on a thermostatted hot plate at a temperature of 80° C. overnight to allow the reaction to complete. When all of the ethanol and side product, ammonia, were evaporated, a pale yellow semi-solid of the TOA-PYRR was obtained. The synthesized inhibitors were added directly to the CICs in various weight percents (wt. %) between 1 and 10%.

A number of possible oil soluble inorganic compounds containing $Zn^{2+}$, phosphate (Phos), and molybdate were considered. To this end we attempted to synthesize potential hydrocarbon-soluble compounds of ADOGEN®+molybdate, ADOGEN®+molybdophosphoric acid and the tri-octyl ammonium analogs. Of those that were successfully synthesized, the organic complex trioctylamine+12-Molybdophosphoric acid did not dissolve in any of the CICs. A CIC-soluble ADOGEN®+phosphoric acid complex was successfully synthesized by the following procedure:

A 1:2 mixture of ADOGEN® and concentrated phosphoric acid was heated with stirring at 120° C. overnight in order to volatilize HCl. Excess acid favors formation of HCl with subsequent elimination through volatilization. The resulting oil was dissolved in toluene and the toluene solution was subjected to multiple extractions with water to remove excess phosphoric acid. Flushing with nitrogen gas was then performed to remove the solvent. The resulting oil was added to the CIC.

The respective coatings were prepared using either a Meyer bar or by spin coating onto a vacuum chucked 3"×3" (7.62 cm×7.62 cm) specimen. The 3"×3" (7.62 cm×7.62 cm) Al 2024-T3 samples were deoxidized in SANCHEM 1000™ (38° C., 15 minutes), rinsed thoroughly and dried, immediately before coating. All B and A coatings were spin coated @ 650 rpm for 45 sec., using about 2 mL of solution. C coatings were coated @ 950 rpm. Coated samples were air dried for at least 24 hours before testing.

The equipment 500 used for the following analysis appears in FIG. 5. In this Figure, a CPC-coated surface 510 is shown having a crevice 520 adjacent to the CPC 510. A working electrode 530 (such as a Cu rotating disk electrode (RDE)) is positioned above the crevice 520 and surface 510. In this Figure, a Ag/AgCl reference electrode 540, along with a Pt counter electrode 550. Under each of the reference 540 and counter 550 electrodes is an "O-Ring" 555. Each of the reference 540 and counter 550 electrodes is surrounded by a Plexiglass cell 560.

The release of active ORR inhibitors can be detected by a decrease in the cathodic ORR current at a Cu rotating disk electrode (RDE) placed within a calibrated distance from the coated surface. To accomplish this, the coated sample is placed in the cell and the plexiglass plate forming the top part of the cell is tightened so that the gasket forms a seal to the sample. The Ag/AgCl reference electrode is inserted into the orifice on the side of the cell so that it will contact the electrolyte. This work is described in detail in U.S. Patent Application 2005-0082174, which is commonly-owned and incorporated herein in its entirety by reference.

The platinum RDE polished to a 0.3 μm finish followed by a water rinse is plated under galvanostatic control with 2 μm of copper in copper pyrophosphate solution. The sample stage is leveled, the RDE is connected to the rotator, and the rotator is then adjusted so that the RDE points to the center of the cell. A TEFLON™ spacer of 0.125 mm placed on the sample enables the operator to control the movement of the sample stage until the RDE just touches the spacer. The translation drive is zeroed at this position to define the test position for the RDE. The electrodes are connected to the PAR 273A potentiostat (auxiliary to the Pt annular electrode of the cell, and reference to the Ag/AgCl and working to the Cu RDE).

After filling the cell with 5% NaCl, electrode rotation starts at 2000 rpm with an applied bias of −1.2 V for 60 seconds. A potential of −0.7 V vs Ag/AgCl is immediately applied, and the current response is monitored as a function of time. Several figures of merit can be obtained for the active inhibition provided by the coating. The steady state current, $I_d$ that flows after 1000s of polarization at −0.7 V defines a figure of merit as follows:

$$\text{Inhibitor Effectiveness} = I_{do}/I_d, \tag{1}$$

where $I_{do}$ is the steady state cathodic current flowing in the absence of the inhibitor and $I_d$ is that flowing in the presence of the inhibitor.

Electrochemical impedance measurements were made with coated Al 2024-T3 mounted in 23 cm² cells and exposed to 0.5 M NaCl for 24 hours. The measurements were made between 10000 Hz and 0.03 Hz with the specimen controlled at open circuit.

A number of approaches were used to evaluate coating resistance, $R_{cor}$, taken from an extrapolation of the impedance spectrum to the zero frequency limits. The best approach entailed the assumption that at low frequencies the impedance could be approximated by a resistor in parallel with a constant phase element having a frequency dependent admittance in the form $1/R_{cor}+\text{constant}*(j\omega)^n$ where n is a constant between 0.5 and 0.9. Hence the real part of the admittance 1/Z at low frequencies takes the form:

$$1/Z = 1/Rcor + k1*\omega^{k2} \quad (2)$$

Where Rcor is the corrosion resistance and k1 and k2 are constants.

Least squares analysis of the low frequency region using Wavemetrics IGOR® allows evaluation of $R_{cor}$. We recognize that this is an approximate evaluation of corrosion resistance.

As a result of the screening tests, a number of specimens (summarized in Appendix I), were selected for extended exposure tests of Phase I. The formulations appear in Table 3 and include both baseline and formulated CICs with selected active inhibitors. Table 4 lists those materials subsequently selected for Phase II testing. Table 5 lists the formulations submitted for outdoor exposure at Daytona Beach.

TABLE 3

Phase I Inhibitor Compositions

| Baseline CIC | Active Inhibitor |
|---|---|
| A | None |
| A | 5% TOA + PYRR |
| B | none |
| B | 1% TOA + DMT |
| B | 5% TOA + PYRR |
| B | 10% TOA + PYRR |
| C | none |
| C | 5% AD + DMDTC |
| C | 10% AD + DMDTC |

TABLE 4

Phase II Inhibitor Compositions

| Baseline CIC | Active Inhibitor |
|---|---|
| A | None |
| A | 5% TOA + PYRR |
| A | 5% AD + DMDTC, 3.3% Zn Stearate, 3.3% AD Phos |
| B | none |
| B | 5% TOA + DMT |
| B | 5% TOA + PYRR |

TABLE 5

| Code | Baseline CIC | Inhibitor |
|---|---|---|
| MK1 | C | None |
| MK2 | A | None |
| MK3 | A | 5% TOA-PYRR |
| MK4 | A | 3.3% ea Zn stearate, Ad-Phosphate, AD dimethyl dithiocarbamate |
| MK5 | B | None |
| MK6 | B | 5% DOA Dimercaptothiadiazole |
| MK7 | B | 5% TOA-PYRR |
| MK8 | A' | None |
| MK9 | A' | 5% TOA-PYRR |

FIG. 6 shows the current density for the reduction of oxygen at a Cu RDE as a function of the inverse diffusion length (proportional to the square root of the rotation rate). In the absence of an inhibitor, a clear linear dependence of the ORR current density on the inverse diffusion length results. Relatively low concentrations of compounds that provide good inhibition of ORR effectively eliminate this rotation rate dependent cathodic current, as shown in FIG. 6.

FIG. 7 shows the ORR currents as a function of the inverse diffusion length for the RDE cathode placed 0.125 mm above the respective coated surfaces. The C CIC shows no apparent decrease in the current at the Cu RDE cathode, suggesting no release of ORR inhibitors. The other two baseline coatings show a slight but not particularly dramatic decrease in the ORR currents, suggesting a small ORR inhibition activity. On the other hand, when the C coating contained 10% of AD-DMDCT inhibitor, a significant release of an ORR inhibitor was evidenced by a decrease in the ORR current at high rotation rates, as shown in FIG. 7.

Although the RDE tests provide information on the release of an ORR inhibitor by the respective coating, they might not predict overall performance since other properties such as the barrier property of the coating in the presence of the inhibitor also remains important to the overall coating performance. One can easily imagine that the addition of an effective ORR inhibitor to a CIC could degrade its barrier performance and result in less effective corrosion protection. In short, the barrier behavior of the coating or modified coating must also be assessed.

Electrochemical impedance spectroscopy provides the tool for evaluating the barrier performance of protective non-conductive coatings. Such coatings with good barrier integrity exhibit a nearly inverse impedance magnitude versus frequency spectrum, but those with paths of ionic conductivity give rise to a resistance, called here $R_{cor}$, that shorts the coating within 24 hours of exposure to 0.5 M NaCl. For example, FIGS. 8A and 8B show typical impedance spectra, in this case for the C coating with various levels of AD-DMDCT. A small % of the inhibitor has a beneficial influence on the impedance as evidenced by high values in the inverse frequency region, but increasing the addition of inhibitor seems to lower the impedance for this particular case. In all cases, at least 24 hours exposure is required for the impedance behavior to achieve a steady state behavior as shown by typical results in FIG. 9.

A summary of all of the data appears as Appendix 1, as mentioned earlier, and Appendix 2 contains many of the abbreviations used herein. Appendix 1 gives the following: the baseline CIC, the inhibitor(s) the inhibitor conentration(s), $R_{cor}$ determined after 24 h exposure to 0.5 M NaCl, log $R_{cor}$, the effectiveness multiplier (equal to $R_{cor}$ (inhibitor)/$R_{cor}$(no inhibitor)), $I_{do}/I_d$. Note that the effectiveness multiplier represents a figure of merit for the effectiveness of the inhibitor to enhance the barrier properties of the coating or metal passivity whereas $I_{do}/I_d$ measures the effectiveness of the CIC for releasing an ORR inhibitor.

$I_{do}/I_d>2$, and effectiveness multipliers >10 can be considered as thresholds for significant improvement in the performance coating with the addition of the inhibitor. Considering these threshold performance criteria, several promising formulations appear. They may be summarized as follows:

TOA+PYRR complex enhances the ORR inhibition by all three baseline coatings and enhances both barrier and ORR effectiveness of the B coating.

to BMS3-35). Based on the Phase I test results and extended testing, optimized ECIC formulations were developed for extended exposure testing in Phase II. These extended tests used a prototype lap joint configuration to evaluate the performance of these ECIC formulations in crevice conditions.

In Phase I, six ECICs that were based on 3 CICs qualified to BMS3-23 were screened to the requirements of BMS3-23. The performance requirements of BMS3-23 are shown in Table 6 and the materials tested are described in Table 3. Coupons were prepared for Phase I testing as shown in Table 6. CPC and ECIC coatings were applied in accordance with BMS3-23.

TABLE 6

| Test | Performance Requirement | Test Method |
|---|---|---|
| 1. Water Displacement Ability | No evidence of pitting, mottling, or stain. | MIL-C-16173 FL 1 |
| 2. Viscosity | Viscosity at 75 +/− 1 F to be within 10 percent of the average value determined at the time of qualification and listed on the QPL. Prepare aerosol samples in accordance with procedure described in Section 8.1. | ASTM D 445 |
| 3. Corrosion - Inhibiting Characteristics | a. Maximum 3 corrosion dots (>1 mm) per 10 square inches after 100 hours salt spray exposure. | FED-STD-791 Method 4001 FL 1 |
| | b. No appreciable attack as defined in ASTM G 34, FIG. 1, after 48 hours exposure (exfoliation test). | ASMT G 34 FL 1 |
| 4. Functional Penetration | a. No panel fay surface area to be less than 80 percent wetted in 1 hour. b. Average of three panels to be 85 percent, or better, wetted in 1 hour. | BMS3-23 Section 8.2.1 |
| 5. Practical Penetration | Average penetration 2.0 inches, minimum. | BMS3-23 Section 8.2.2 |

FL 1 Except use bare 2024-T3 aluminum

Zn stearate improves the barrier properties of the C and B coatings but has no significant influence on the ORR inhibition.

The AD+DMDTC complex enhances the ORR inhibition in all three coatings depending on the level.

An overall performance factor can be determined by multiplying the effectiveness multiplier times $I_{do}/I_d$, shown in Appendix 1. Alternatively, if a threshold barrier and ORR inhibition behavior define necessary conditions for corrosion protection, then the following hypothetical algorithm defines a useful figure of merit, $\phi$:

$\phi=0$ if $R_{cor}<1E7$ ohm cm$^2$ $\phi=0$ if $I_{do}/I_d \leq 2$,

Otherwise, $\phi=$(Effectiveness multiplier)$\times(I_{do}/I_d)\times\log(Rcor/1E7)$ The parameter, $\phi$, appears in the last column in Appendix 1. Clearly the ORR inhibition and barrier thresholds are defined as 2 and 1E7 ohm cm$^2$, respectively. Those values not equal to zero have been highlighted.

The accelerated exposure tests described herein were performed by Dr. Joseph Osborne of the Boeing Company. Additional outdoor exposure tests to demonstrate the usefulness of selected inhibitor CIC combinations were performed at Daytona Beach by Dr. William Abbott.

The work performed was divided into two phases. In Phase I, several Enhanced CIC (ECIC) formulations were screened to the performance requirements of BMS3-23 (also common All test panels were printed with an identifying number and description. All panels, except those for the sandwich corrosion tests, were solvent wiped, emulsion cleaned in Brulin 815 GD, alkaline cleaned in ISOPREP™ 44 and deoxidized in DEOXALUME™ 2300. The test solutions of CICs were mixed prior to each use by rolling on a ball mill roller at 50 rpm for at least 5 minutes. A motorized system dipped the panels into the test solution to apply the coating. The assemblies were kept submerged for at least one minute and then withdrawn at a rate of 4 inches per minute. The coated panels were hung vertically in a hood to dry for the required period.

The panels were cleaned and dipped in the appropriate CIC solution. The dipped panels were then examined at 3 hours and 24 hours after dipping.

The 3"×5" panels were drilled to the pattern of BMS 3-29, as shown in FIG. 10. The 3" side of the drilled end was beveled to approximately 45° and the burrs were removed from the holes 1020 by sanding. (Functional Penetration Test) The panels were cleaned as above and primed with 44 GN-072 and allowed to cure for 14 days forming a primed surface 1010. After being given a solvent wipe, the test panels were fabricated by placing two primed panels, face to face, with the bevel towards the mated panel (forming a "V" groove) and fastening with HI-LOK™ fasteners.

The panels were cleaned as above and the backs were masked with tape. The panels were then dipped and hung to dry for ~4 days. They were then scribed with an "X" and tested with the penetration panels (test 4). The 3"×5" panels were drilled and cleaned as in the Functional Penetration test. These panels were not primed, but were assembled as in the Functional Penetration test. The panel backs were masked and then the assemblies were dipped in the appropriate CIC and hung to dry for ~4 days before being placed in a neutral salt spray chamber.

The 3"×5" panels were drilled and cleaned as in the Functional Penetration test. The panels were left bare and assembled as in the Functional Penetration test. The backs of the lap joint assemblies were masked with tape. The assemblies were then dipped with the open beveled edge up, in the appropriate CIC. They were hung to dry in a hood for >72 hours before being placed in tanks of acidified salt solution (4 M NaCl, 0.5 M KNO$_3$, 0.1 M HNO$_3$). The panels were laid, masked side down, on glass rods and submerged in the salt solution at a ratio of >40 ml. per square inch exposed surface area. The panels were wiped with MEK and then acetone. The filter papers were dipped into the appropriate CIC solution and allowed to drain. The soaked papers were placed on a panel and covered with the matching panel. The panel sets were held together with vinyl tape. The C coating and C +5% AD+DMDTC coating were thicker and did not drain, but squeezed out upon assembly. The panels were cleaned as above and the backs were masked with tape. The panels were dipped in the appropriate CIC and hung to dry for seven days. The panels were then placed in a water bath at 40° C. for 28 days. Tables 7 and 8 summarize the Phase I tests performed and sample preparation.

Phase I Results

Results for the drying time test are shown in Table 9. The C containing CICs all failed the test at both the three- and 24-hour mark. These solutions all formed a greasy film on the panel that did not dry. The results for functional penetration are shown in Table 10. All samples except those containing C flowed over the joint and were not contained within the tape-joint cavity. The C samples seemed to be thicker/"waxy" and barely wept over the joint. After 25 hours, the tape was removed and the tape cavity area was wiped with gauze, but only the C samples were "wipeable". The other samples had all dried. All samples showed weeping through the lap joint to the other side of the assembly.

TABLE 10

| Corrosion Inhibiting Compound | Average Coverage | Comments |
| --- | --- | --- |
| B | 88 | Coverage missing on 1 outer rivet side |
| B + 1% TOA + DMT | 93 | — |
| B + 5% TOA + PYRR | 93 | — |
| B + 10% TOA + PYRR | 98 | — |
| A | 90 | — |
| A + 5% TOA + PYRR | 95 | — |
| C | 95 | — |
| C + 5% AD + DMDTC | 85 | — |
| C + 10% AD + DMDTC | 92 | — |

At 48 hours, the faces of the C panels were starting to turn dark, with the inhibitor-containing samples being the worst. The scribes on all the panels were rated 7, with most of the panels having >60% dark or white corrosion. Only the A-coated panels with inhibitor had ~30% corroded and ~60% dull scribes. The pattern continued until the panels were removed at 216 hours. The inhibited C panels had 95-100% of the panel face covered with corrosion. The uninhibited C panels had been smeared when originally placed in the chamber that caused the corrosion on these two panels to generally follow the smears possibly as a result of localized thinning of the coating. The balance of the panels were mostly clear of corrosion except for occasional spots or areas of "runs" that were dark with white corrosion. The scribes were all >95% dark or white corroded, except the inhibited A baseline CIC samples, which still had 25% dull areas.

When reviewing the salt fog exposure results, the B CIC containing the 1% TOA+DMT does appear to exhibit better protection after the 216 h exposure. The A baseline CIC containing the 5% TOA+PYRR also shows improvement.

Supplemental salt fog exposure of the A CIC with different levels of the TOA+DMTC inhibitor also demonstrates an improvement in the scribed corrosion resistance as shown after 186 hours of exposure. The less corrosion product appears in the scribe for the sample containing the inhibitor at both the 5 and 10% levels. However, at 10% a mottled appearance of the entire surface suggests that there is some degradation of barrier behavior at this higher level.

TABLE 9

| Corrosion Inhibiting Compound | 3-Hour | 24-hour | Rating Pass/Fail |
| --- | --- | --- | --- |
| B | Dry to Touch | dry to touch | P |
| B + 1% TOA + DMT | Dry to Touch | dry to touch | P |
| B + 5% TOA + PYRR | Dry to Touch | dry to touch | P |
| B + 10% TOA + PYRR | Surface is still slightly sticky - touch leaves glove marks on film surface | dry to touch, but still leaves slight glove marks on film surface | P |
| A | Dry to Touch | Dry to touch | P |
| A + 5% TOA + PYRR | Surface very slightly sticky - touch leaves slight glove marks on film surface | dry to touch, but still leaves slight glove marks on film surface | P |
| C | "matte" finish - still oily to touch - smears | "matte" finish - still oily/greasy to touch - smears easily | F |
| C + 5% AD + DMDTC | "matte" finish - still oily to touch - smears | "matte" finish - still oily/greasy to touch - smears easily | F |
| C + 10% AD + DMDTC | "matte" finish - still oily to touch - smears | "matte" finish - still oily/greasy to touch - smears easily | F |

The A with the inorganic+organic combination (containing AD+DMDTC, Zn stearate, AD+Phos) also shows good behavior in the laboratory. Effort was made to include this formulation in the tests in Seattle and at Daytona Beach. However, problems with the stability of the material with respect to sprayability precluded considering this formulation for some of these tests.

These assemblies followed the same pattern of the flat panels in that the inhibited C samples darkened faster than the others. By 360 hours, the B assemblies were covered with dark spots, and the inhibited B samples much less so. The A samples had only occasional spots of corrosion.

At 1200 hours, the A samples only had "runs" of corrosion from the top and joint areas of the panel; while the balance of the samples were mostly dark, with spots/"runs" of white corrosion. At 2016 hours, one of each CIC set was removed from the salt spray chamber, rinsed, and allowed to dry. The exterior surfaces had not changed significantly, with only a further build up of corrosion. The fay surfaces were mostly corroded, except the 10% inhibited B that still had ~10% clean but dull surface. The areas ~1/16" around the rivets on all the panels were also clear. At 3744 hours the balance of the panels were removed but showed no significant changes from those removed previously.

Exfoliation corrosion resistance was evaluated on lap panels that were exposed to the exfoliation solution for an extended period. The CICs were anticipated to pass the BMS3-23 requirement of protection of boldly exposed panels. What was of additional interest was the performance of the CIC in protecting bare fay surfaces, thus the use of the penetration lap fixture.

After 24 hours immersed in the solution, bubbles were evolving from the joint and edges of all the panels, and appeared sporadically across the face. Only on the C samples with 5 and 10% inhibitor did bubbles evolve from most of the face of the panel, and the panel surface was darkening. A few panels had dark "runs" and bubble formation on the top panel of the assembly that seemed to be from solution running from the attachment point for the dipping procedure.

At 48 hours, all panels, except the inhibited C panels, had stabilized at small to medium amounts of bubbles on the surface of the panel. This status remained as the collars continued to dissolve and flake off until the panels were removed. The inhibited C samples were covered with bubbles and dark gray or red at 48 hours and seemed to continue to build with addition of occasional white corrosion products, until the panels were removed. All CICs and ECICs appeared to pass the BMS3-23 requirement for exfoliation corrosion.

After 1560 hours, the solution pH had risen to 3.38 and therefore was replaced with freshly made solution. Neither the panels nor the tank walls were rinsed off. There was no obvious bubbling when the new solution was added. After three hours, only the extra panel (C +10% AD+DMDTC) showed slight active bubbling (from the red areas). On the balance of the panels, there was only occasional bubbling from the edges or rivet collars.

After 2038 hours, one of each CIC set was removed from the solution rinsed off and allowed to dry. The exterior surfaces had corrosion around the collars and at sporadic spots on the surface of the panels. The collars had mostly dissolved. Again, the inhibited C samples were completely covered with corrosion.

Several of the inhibitor-formulated B samples appeared to exhibit significantly improved corrosion resistance in the fay surface. The surfaces that had been protected with the baseline B and the B with the 1% TOA+DMT showed significant corrosion, as evidenced by accumulations of white and dark corrosion product. On the other hand, the samples containing the 5% and 10% TOA+PYRR exhibited much cleaner fay surfaces.

After 3068 hours the balance of panels were removed and rinsed. The exterior appearance of the panels had not changed significantly from the earlier removed set except the collars had undergone further dissolution. The fay surfaces of all samples were mostly corroded. A description of the fay surfaces is shown in Table 11.

The results of the sandwich corrosion test are shown in Table 12. The only CICs that did not meet the requirements of "corrosion less than that caused by distilled water" were the C solutions containing the Adogen inhibitor.

The results of the water immersion test are shown in Table 13. The C containing CICs all failed the test by easy removal with light wiping.

Phase II Results

Based on the results from Phase I and additional testing, optimized formulations of ECPC materials were developed. The three ECICs and the two control CIC formulations are shown in Table 4.

TABLE 11

| Corrosion Inhibiting Compound | 2038 Hours | 3068 Hours | Ending Fay Surface |
|---|---|---|---|
| B | corrosion around collars & edges, collars 80-90% gone, panel clear except rnd. spots of corrosion | — | 100% corrosion |
| B | — | corrosion @ edges, joint & around collars, collars 80-100% gone | 95% corrosion, 5% dull |
| B + 1% TOA + DMT | corrosion around collars & edges, collars 85-95% gone, panel clear except rnd. spots of corrosion | — | 100% corrosion |
| B + 1% TOA + DMT | — | corrosion @ edges, joint & around collars, collars 80-100% gone, scattered rust pits | 95% corrosion, 5% dull |
| B + 5% TOA + PYRR | corrosion around collars & edges, collars 80-90% gone, panel clear except rnd. spots of corrosion | — | 85% corrosion, 15% dull |
| B + TOA + PYRR | — | corrosion @ edges, joint & around collars, collars 90-100% gone, some wht corr on collars & jnt | 100% corrosion |
| B + 10% TOA + PYRR | corrosion around collars & edges, collars 60-90% gone, panel clear except rnd. spots of corrosion | — | 100% corrosion |
| B + 10% TOA + DMTC | — | corrosion @ edges, joint & around collars, collars 80-100% gone, circles in coating from bbls mainly around joint | 95% corrosion, 5% dull |

TABLE 11-continued

| Corrosion Inhibiting Compound | 2038 Hours | 3068 Hours | Ending Fay Surface |
|---|---|---|---|
| A | corrosion around collars & edges, collars 90-100% gone, panel clear except rnd. spots of corrosion | — | 100% corrosion |
| A | — | corrosion @ edges, joint & around collars, collars 90-100% gone, wht corr on collars & jnt | 90% corrosion, 10% dull |
| A + 5% TOA + PYRR | sml amts corrosion around collars & edges, collars 60-90% gone, panel pretty clear | — | 100% corrosion |
| A + 5% TOA + PYRR | — | corrosion @ edges, joint & around collars, collars 30-60% gone | 100% corrosion |
| C | corrosion around collars & edges, collars 80-90% gone, panel clear except rnd. spots of corrosion | — | 90% corrosion, 10% dull |
| C | — | corrosion @ 70% of edge, 50% of jnt & around collars, collars 60-80% gone (corr runs from CIC dip attach point) | 100% corrosion |
| C + 5% AD + DMDTC | panel covered w/corrosion, collars 80-90% gone, | — | 100% corrosion (thick) |
| C + 5% Adogen + dmdtc | — | 100% covered w/red corrosion w/part overlay of wht, collar 90-100% gone | 100% corrosion (thick) |
| C + 10% Adogen + dmdtc | panel covered w/corrosion, collars 80-90% gone, | — | 100% corrosion (thick) |
| C + 10% Adogen + dmdtc | — | 100% covered w/red corrosion w/part overlay of wht. collar 90-100% gone | 100% corrosion (thick) |
| C + 10% Adogen + dmdtc | — | 100% covered w/red corrosion w/part overlay of wht, collar 90-100% gone | 100% corrosion (thick) |

TABLE 12

| Corrosion Inhibiting Compound | Rating (ASTM F1110) | Comments | Rating |
|---|---|---|---|
| B (both samples) | 0/0 | | P |
| B + 1% TOA + DMT (both samples) | 0/0 | | P |
| B + 5% TOA + PYRR (both samples) | 0/0 | | P |
| B + 10% TOA + PYRR | 0/0 | | P |
| B + 10% TOA + PYRR | 1/0 | Slight discoloration 1 slide | P |
| A (both samples) | 0/0 | | P |
| A + 5% TOA + PYRR | 0/0 | | P |
| A + 5% TOA + PYRR | 1/0 | Slight discoloration 1 slide, outside filter paper | P |
| C (both samples) | 0/0 | | P |
| C + 5% AD + DMDTC | 3/3 | Tan discoloration both sides, outside filter paper | F |
| C + 5% AD + DMDTC | 3/4 | Tan discoloration both sides, mainly outside filter paper | F |
| C + 10% AD + DMDTC | 3/3 | Tan discoloration both sides, mainly outside filter paper | F |
| C + 10% AD + DMDTC | 4/4 | Tan discoloration both sides, mainly outside filter paper | F |
| C + 10% AD + DMDTC | 4/5 | Tan discoloration both sides, mainly outside filter paper | F |
| DI H20 | 1/1 | Discoloration both sides, in/outside filter paper | — |
| DI H20 | 0/2 | Discoloration 1 side, in/outside filter paper | — |

TABLE 13

| Corrosion Inhibiting Compound | Color - Comments | Rating |
|---|---|---|
| B | Red/orange-tan - complete removal w/wiping | P |
| B + 1% TOA + DMT | Red/orange-tan - no removal | P |
| B + 5% TOA + PYRR | Red/orange-tan - no removal | P |
| B + 10% TOA + PYRR | Orange/tan - light smearing, no removal | P |
| A | Orange/tan - light smearing, no removal | P |
| A + 5% TOA + PYRR | Yellow/tan - light color transfer, coating remained | P |
| C | Light tan - easy removal | F |
| C + 5% AD + DMDTC | Light tan - easy removal | F |
| C + 10% AD + DMDTC | Light tan - easy removal | F |

The experimental and baseline materials were tested on lap joint coupons based on the penetration setup shown in FIG. 10. This coupon allows evaluation of the CIC on both boldly exposed surfaces and for its ability to protect the fay surface in a lap joint. The CIC materials were applied directly to the bare metal coupons to represent the worst-case scenario; no primer was used on the coupons.

The coated test coupons were subjected to four exposure conditions: neutral salt fog, humidity exposure, exfoliation solution, and outdoor exposure. In neutral salt fog exposure the coupons were oriented so that salt solution drainage on the panel would be caught in the bevel and directed into the fay surface. This is opposite of a typical exterior fuselage configuration where rain, spray, etc., would drain away from the joint. It does represent the interior of a lap joint where condensation and/or liquid spills would drain directly into the joint, being forced into the joint by any pressurization of the aircraft.

Researchers at the University of Virginia have studied lap joints for some time and have identified the electrolyte materials found inside a corroded joint. A set of simulated lap joints was immersed in this solution to saturate the fay surface area. CIC was then applied and the coupons were placed in a humidity chamber to produce conditions that might be conducive to corrosion in the lap area.

The exfoliation results from Phase I showed promise to be able to differentiate between CIC formulations. Imersion of the lap coupons in exfoliation solution was repeated in Phase II. The pH of the solution was monitored and replaced when it became greater than ~pH 3.5. This occurred at approximately 250-hour intervals.

Laboratory exposure conditions can only approximate the combination of conditions found in the actual operating environment of aerospace vehicles. A set of lap coupons was placed on a test rack adjacent to the runway at Whidbey Island Naval Air Station in Washington State.

For salt spray, humidity, and exfoliation exposure, sufficient test coupons were prepared to allow for periodic removal and examination so as to better monitor the progression of corrosion on the coupons. The test matrix is shown in Table 14. Test panels were cleaned and deoxidized prior to securing with HI-LOK™ fasteners to form an 8 sq. inch lap joint.

TABLE 14

| Test | Test Method | Sample Material | Cleaning | Pre-Treatment | Accessory Parts Needed |
|---|---|---|---|---|---|
| Exfoliation Corrosion | ASTM G34/BMS3-23, 5.0 Table II | Al 2024 - T3 bare | Solvent wipe, Brulin 815GD, Isoprep 44, Amchem 6 | Drill, bevel, mask back CIC coat per 8.1e | Hi-Lok bolts/collars dipping system drying area covered container support rods salt solu. |
| Outdoor Exposure (Whidbey Island) | — | Al 2024 - T3 bare | Solvent wipe, Brulin 815GD, Isoprep 44, Amchem 6 | Drill, bevel, mask back CIC coat per 8.1e | Hi-Lok bolts collars dipping system drying area |
| Neutral Salt Spray - Penetration Panel | BSS7249 | Al 2024 - T3 bare | Solvent wipe, Brulin 815GD, Isoprep 44, Amchem 6 | Drill, bevel, mask back CIC coat per 8.1e | Hi-Lok bolts collars dipping system drying area |
| Inoculated Humidity Exposure | — | Al 2024 - T3 bare | Solvent wipe, Brulin 815GD, Isoprep 44, Amchem 6 | Drill, bevel, mask back CIC coat per 8.1e | Hi-Lok bolts collars inoculant dipping system drying area |

Exfoliation Corrosion—Assemblies were dipped into the assigned CIC formula and held submerged for 1-2 minutes. They were withdrawn from the bath at a constant rate of 4"/min. and hung vertically to dry overnight. The assemblies were divided into the required time periods and placed flat in baths of the corrosion solution. The pH is monitored periodically and the solution is replaced when it reached ~3.5 pH (after an initial 0.5 pH).

Outdoor Exposure—Assemblies were dipped into the assigned CIC formula and held submerged for 1-2 minutes. They were withdrawn from the bath at a constant rate of 4"/min. and hung vertically to dry overnight.

Inoculated Humidity Exposure—Assemblies were immersed in the UVa lap joint simulant solution for one hour and then placed in a 180° F. oven for one hour to dry. They were then dipped into the assigned CIC formula and held submerged for 1-2 minutes. They were withdrawn from the bath at a constant rate of 4"/min. and hung vertically to dry overnight. The assemblies were placed on racks in a 120° F., condensing humidity cabinet. The recipe for the lap joint stimulant is: 20 mM NaCl, 4mM $NaNO_2$, 2 mM NaF, and 4 mM $NaHCO_3$, adjusted to pH 9.0 with NaOH Neutral Salt Fog—Assemblies were dipped into the assigned CIC formula and held submerged for 1-2 minutes. They were withdrawn from the bath at a constant rate of 4"/min. and hung vertically to dry overnight. The assemblies were placed on racks in a salt spray cabinet.

Panels exposed to neutral salt spray were examined after 1000- and 2000-hours exposure. After 1000 hours exposure the B coating w/5% additives and A coating w/5% additives performed the best at the 1008 hr mark with only slight corrosion on the edges. The other CIC panels showed corrosion of 0.5"-1" from the edge of the fay surface. Surface corrosion was present with the unmodified CIC materials. The A +(AD+DMDTC, Zn Stearate, AD+Phos) shows extensive reddish deposits on the surface of the panels that masks any corrosion that might be present.

After 2000 hours of exposure differences between the CICs become more apparent. Interestingly, the B w/5% additives performs worse than B alone, a reversal of the 1000-hour observations. A with 5% TOA +PYRR performs better in the fay surface areas than does the baseline A having no additional inhibitors. The AD formulation (AD-DMDTC, Zn-Stearate AD-Phos) gives reddish deposits on the exposed surfaces but the fay surfaces are slightly less corroded than the baseline A. The best overall performer is the A with 5% TOA -PYRR. The fay surface area at 2000 hours exposure shows less corrosion than the other formulations. The exposed surfaces are equal to or better than the B-023 coupons, the second best in this test.

All of these exposures were accomplished in duplicate. Additional samples are needed to assess the variability in the overall results. Extending the test duration to 3000 hours might also better differentiate the better performers.

The testing of humidity exposure of inoculated panels had panels examined at 500-hour intervals with a maximum exposure time of 1500 hours. The B coating with 5% TOA+DMT, the as-received A and the A with the 5% TOA+PYRR performed the best showing little or no corrosion at each test point through the final 1512 hours. The B coating showed slight corrosion at the center of the fay surfaces at all three test points, while the A containing 3.3% (AD+3.3% each (AD+DMDTC, Zn Stearate, AD+Phos) exhibited up to 70% dark corrosion on the fay surface at the final test point.

The exfoliation solution interacts with the panels immersed in it as evidenced by bubbling and a rise in pH. The pH of the solution was monitored and was replaced when the pH rose above about pH 3.5. The data for the solution pH and replacement schedule are shown in Table 15.

0.25" to 0.75" of corrosion from the edge. All show significant corrosion at fasteners and at the lap edges on the exposed surfaces. The A with (AD+DMDTC, Zn Stearate, AD+Phos) shows significant orange material on the surface, similar to that seen in other exposures.

After 1002 hours of immersion exposure all of the panels had 70 to 95% of the fay surface covered with corrosion, with the exception of the panel coated with A with (AD+DMDTC, Zn Stearate, AD+Phos). While the exposed surface showed extensive deposits, the fay surface was only ~20% corroded. At the 1505-hour examination the fay surfaces of all of the panels show significant corrosion. The A and A +(AD+DMDTC, Zn Stearate, AD+Phos) inhibitors are the best performers. Corrosion on exposed surfaces and fasteners is somewhat greater than that observed at the 517 hour mark.

TABLE 15

Exfoliation Solution pH.

| Hours | 500 Hours | 1000 Hours | 1500 Hours | 2000 Hours | Comments |
|---|---|---|---|---|---|
| 0 | 0.5 | 0.5 | 0.5 | 0.5 | pH paper |
| 15 | 0.8 | 0.8 | 1.0 | 1.0 | pH paper |
| 42 | 1.0 | 1.0 | 1.0 | 1.0 | pH paper |
| 112 | 2.64 | 1.79 | 2.00 | 1.69 | pH meter (from here on) |
| 158 | 3.22 | 2.98 | 3.11 | 3.13 | |
| 255 | 3.42 | 3.37 | 3.29 | 3.30 | |
| 283 | 3.49 | 3.45 | 3.37 | 3.38 | Solution changed - pH = 0.43-0.47 |
| 302 | 0.91 | 1.19 | 1.17 | 0.94 | |
| 450 | 3.39 | 3.50 | 3.43 | 3.39 | |
| 517 | 3.44 | 3.56 | 3.45 | 3.50 | |
| 517 | Pulled | 0.67 | 0.68 | 0.71 | Solution Changed |
| 616 | — | 3.41 | 3.37 | 3.41 | |
| 641 | — | 3.42 | 3.38 | 3.44 | |
| 687 | — | 3.42 | 3.37 | 3.46 | |
| 763 | — | 3.42 | 3.35 | 3.43 | |
| 785 | — | 3.44 | 3.36 | 3.44 | |
| 787 | — | 0.49 | 0.47 | 0.48 | Solution Changed (0.52) |
| 812 | — | 1.09 | 1.08 | 1.22 | |
| 859 | — | 2.98 | 2.97 | 3.06 | |
| 933 | — | 3.49 | 3.48 | 3.50 | |
| 977 | — | 3.44 | 3.44 | 3.45 | |
| 1000 | — | 3.44 | 3.45 | 3.46 | |
| 1002 | — | Pulled | 0.65 | 0.68 | |
| 1024 | — | — | 1.10 | 1.33 | |
| 1100 | — | — | 3.39 | 3.43 | |
| 1145 | — | — | 3.23 | 3.23 | |
| 1264 | — | — | 3.37 | 3.38 | |
| 1269 | — | — | 0.44 | 0.43 | Solution Changed |
| 1313 | — | — | 2.36 | 2.26 | |
| 1359 | — | — | 3.24 | 3.26 | |
| 1432 | — | — | 3.36 | 3.35 | |
| 1481 | — | — | 3.34 | 3.34 | |
| 1504 | — | — | 3.35 | 3.36 | |
| 1505 | — | — | Pulled | 0.44 | |
| 1527 | — | — | — | 0.83 | |
| 1625 | — | — | — | 3.32 | |
| 1695 | — | — | — | 3.31 | |
| 1770 | — | — | — | 3.45 | |
| 1772 | — | — | — | 0.40 | Solution Changed |
| 1819 | — | — | — | — | |
| 1867 | — | — | — | — | |
| 1939 | — | — | — | — | |
| 1987 | — | — | — | — | |
| 2011 | — | — | — | — | |
| 2011 | — | — | — | Pulled | |

Panels exposed by immersion in exfoliation solution were removed and examined at 500-hour intervals with a 2000-hour maximum exposure duration. The exfoliation exposure shows the greatest differences between the CICs. After 517 hours immersion exposure the B with 5% TOA+DMT showed the least corrosion, with only slight corrosion at the edges of the fay surfaces. All others showed corrosion of The outdoor exposure panels were examined after 77 days of exposure to the ambient environment at Whidbey Island Naval Air Station. One of each set of panels was disassembled for observations. Not much corrosion is evident either on the exterior or in the fay surface, consistent with expectations for this limited exposure regimen. It is interesting to note that the red coloration appears on the A with the (AD+DMDTC, Zn Stearate, AD+Phos) at this minimal exposure level.

The formulations in Table 5 were supplied to William Abbott of Battelle-Columbus at the suggestion of Richard Kinzie (Robins AFB). W. Abbott graciously included tests of the inhibitors in Table 5 as coated on steel and Cu coupons at the Daytona Beach test site. Although there appears to be little improvement for the protection of steel by the addition of inhibitor, the A containing the TOA+PYRR does appear to exhibit slightly less corrosion product on the surface.

For the Cu samples, the corrosion loss was followed by means of an electrical resistance measurement. Therefore the extent of corrosion could be monitored quantitatively. The 70- and 102-day results appear in the bar chart in FIG. 11. The 5% TOA+PYRR appears to improve the performance of both of the A and A' (a different coating from the A manufacturer). The 5% TOA+PYRR had a marginal improvement at the longer time for the B coating. On the other hand, 5% TOA+DMT improved the corrosion protection provided to the B coating significantly.

Thus, specific embodiments and applications of corrosion inhibitors have been disclosed. It should be apparent, however, to those skilled in the art that many more modifications besides those already described are possible without departing from the inventive concepts herein. The inventive subject matter, therefore, is not to be restricted except in the spirit of the disclosure presented herein. Moreover, in interpreting the disclosure presented herein, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

APPENDIX 2

Abbreviation and Notation

Rcor=coating resistance in a corrosive environment

DMT=2,5-dimercapt 1,3,4-thiadiazole

DMDTC=dimethyldithiocarbamate

PYRR=1-pyrrolidine dithiocarbamate

AD=ADOGEN®

TOA=trioctyl ammonium

Zn Stearate=zinc stearate

Phos=phosphate

ORR=oxygen reduction reaction

Id=diffusion limited oxygen reduction current

CIC=corrosion inhibiting compound (also a CPC, corrosion protective compound)

We claim:

1. A composition for actively inhibiting corrosion, comprising:
    at least one active corrosion inhibitor compound, wherein the at least one active corrosion inhibitor compound comprises salts of dimethyldithiocarbamate (DMDTC) synthesized with a long chain aliphatic ammonium or an amine compound as a cation; and
    at least one conventional corrosion inhibitor compound, wherein the at least one conventional corrosion inhibitor compound comprises calcium dinonyl naphthalene sulfonate.

2. The composition of claim 1, comprising at least one solvent.

3. The composition of claim 1, wherein the at least one active corrosion inhibitor is present in an amount less than about 20 weight percent.

4. The composition of claim 1, wherein the at least one active corrosion inhibitor is present in an amount less than about 5 weight percent.

5. A coating material comprising the composition of claim 1.

6. A coating material comprising the composition of claim 2.

7. The coating material of one of claims 5 or 6, wherein the material is paint, primer or a combination thereof.

8. A method of producing a composition that actively reduces corrosion, comprising:
    providing at least one active corrosion inhibitor, wherein the at least one active corrosion inhibitor compound comprises salts of dimethyldithiocarbamate (DMDTC) synthesized with a long chain aliphatic ammonium or an amine compound as a cation,
    providing at least one conventional corrosion inhibitor compound or corrosion protection compound, wherein the at least one conventional corrosion inhibitor compound comprises calcium dinonyl naphthalene sulfonate, and
    blending the at least one active corrosion inhibitor and the at least one conventional corrosion inhibitor compound or corrosion protection compound to form the composition.

9. The method of claim 8, further comprising adding at least one solvent.

* * * * *